(12) United States Patent
Ponukumati et al.

(10) Patent No.: US 9,288,646 B2
(45) Date of Patent: Mar. 15, 2016

(54) MULTIPLE SIM MULTIPLE NETWORK DIVERSITY FOR ENHANCING CALL CONNECTIVITY

(71) Applicant: QUALCOMM Incorporated, San Diego, CA (US)

(72) Inventors: Dhananjaya Sarma Ponukumati, Hyderabad (IN); Hareeswara Kumar Modali, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/042,807

(22) Filed: Oct. 1, 2013

(65) Prior Publication Data

US 2015/0092611 A1   Apr. 2, 2015

(51) Int. Cl.
| | |
|---|---|
| H04W 4/00 | (2009.01) |
| H04W 4/16 | (2009.01) |
| H04W 88/06 | (2009.01) |
| H04W 36/14 | (2009.01) |
| H04W 8/18 | (2009.01) |
| H04W 48/18 | (2009.01) |

(52) U.S. Cl.
CPC ............... *H04W 4/16* (2013.01); *H04W 36/14* (2013.01); *H04W 88/06* (2013.01); *H04W 8/18* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 8,385,976 B2 | 2/2013 | Middleton | |
| 2004/0235509 A1* | 11/2004 | Burritt et al. | 455/519 |
| 2005/0059400 A1 | 3/2005 | Jagadeesan et al. | |
| 2006/0183478 A1* | 8/2006 | Jagadeesan et al. | |
| 2007/0249354 A1* | 10/2007 | Seo et al. | 455/436 |
| 2008/0037473 A1* | 2/2008 | Brown et al. | 370/332 |
| 2009/0116443 A1* | 5/2009 | Walker et al. | 370/329 |
| 2009/0247147 A1* | 10/2009 | Hadinata et al. | 455/421 |
| 2011/0230184 A1* | 9/2011 | Tal et al. | 455/425 |

(Continued)

FOREIGN PATENT DOCUMENTS

| | | |
|---|---|---|
| EP | 2544477 A1 | 1/2013 |
| WO | 2006006115 A1 | 1/2006 |
| WO | 2012139755 A1 | 10/2012 |
| WO | 2013021764 A1 | 2/2013 |
| WO | 2013124709 A1 | 8/2013 |

OTHER PUBLICATIONS

International Search Report and Written Opinion—PCT/US2014/056150—ISA/EPO—Dec. 22, 2014.

(Continued)

*Primary Examiner* — Steven H Nguyen
(74) *Attorney, Agent, or Firm* — The Marbury Law Group, PLLC

(57) ABSTRACT

Methods and devices are disclosed for establishing a second call during a first call on a multi-SIM communication device. A quality of the first call between a calling party and a called party using a first subscription for a first network may be determined to be degrading. Network alternatives may be provided for establishing the second call in response to determining that the quality of the first call is degrading. One of the network alternatives may be selected based on an order of suitability for originating the second call. A notification to the called party using information associated with calling party and the second call may be provided before the second call is originated. The information associated with the second call may identify the calling party to the called party before the second call is originated.

41 Claims, 13 Drawing Sheets

(56) References Cited

U.S. PATENT DOCUMENTS

| | | | |
|---|---|---|---|
| 2013/0012135 A1* | 1/2013 | Ruohonen et al. | 455/63.1 |
| 2013/0012208 A1* | 1/2013 | Jeong | 455/435.3 |
| 2013/0023235 A1* | 1/2013 | Fan et al. | 455/411 |
| 2013/0142112 A1 | 6/2013 | Yang et al. | |
| 2013/0225123 A1* | 8/2013 | Adjakple et al. | 455/406 |
| 2013/0288680 A1* | 10/2013 | Rysgaard | 455/435.2 |
| 2014/0357285 A1* | 12/2014 | Smith et al. | 455/450 |

OTHER PUBLICATIONS

Zhang, et al., "Efficient Mobility Management for Vertical Handoff Between WWAN and WLAN", IEEE Communications Magazine, IEEE Service Center, NY, NY, US, vol. 41, No. 11, Nov. 2003, pp. 102-108, XP001185186.

* cited by examiner

Link Priority

Revise when new link quality metric is determined

Priority 1 for current call on Subscription 1

| Network + Metric | SINR dB | Cost | PWR | CQI | RSSI dBm |
|---|---|---|---|---|---|
| Subscription N | 23.7 | 5 | 3 | 13 | -57.0 |
| WLAN | 15.0 | 0 | 2 | 11 | -40.75 |
| Subscription 2 | 3.5 | 7 | 5 | 8 | -75.0 |

FIG. 2A

Link Priority first call

Revise when new link quality metric is determined

Priority 1 for current call on Subscription 1

| Network + Metric | SINR dB | Cost | PWR | CQI | RSSI dBm |
|---|---|---|---|---|---|
| Subscription N | 23.7 | 5 | 3 | 13 | -57.0 |
| WLAN | 15.0 | 0 | 2 | 11 | -40.75 |
| Subscription 2 | 3.5 | 7 | 5 | 8 | -75.0 |

Link Priority second call

Revise when new call is established and new link quality metric is determined

Priority 1 for current call on Subscription N

| Network + Metric | SINR dB | Cost | PWR | CQI | RSSI dBm |
|---|---|---|---|---|---|
| WLAN | 21.0 | 0 | 2 | 13 | -20.75 |
| Subscription 2 | 13.5 | 7 | 6.5 | 8 | -60.0 |
| Subscription 1 | -0.2 | 5 | 9 | 2 | -120.0 |

FIG. 2B

MULTIPLE SIM MULTIPLE NETWORK DIVERSITY FOR ENHANCING CALL CONNECTIVITY

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, may communicate voice and data packets over wireless networks. Further, many such wireless telephones include other types of devices that are incorporated therein. For example, a wireless telephone may also include a digital still camera, a digital video camera, a digital recorder, and an audio file player. Also, such wireless telephones may process executable instructions, including software applications, such as a web browser application that may be used to access the Internet. As network infrastructure evolves, such devices may have access to multiple networks. As such, these wireless telephones may include significant computing capabilities for processing voice and data using a variety of resources, and in some cases simultaneously.

A mobile communication device (e.g., a wireless telephone) may enable a user to utilize multiple subscriptions (that may be associated with the same or different networks). To illustrate, a first subscriber identity module (SIM) of a multi-SIM multi-standby (MSMS) device, or a multi-SIM multi-active (MSMA) device may be associated with a first subscription, a second SIM may be associated with a second subscription, and an Nth SIM may be associated with an Nth subscription. An MSMS or MSMA device may include dual-SIM devices (e.g. DSDS, DSDA, . . . ). In addition to subscription-based resources, devices may have access to wireless networks (e.g., WLAN) that may carry data and may present opportunities for calls using data resources (e.g., SIP, VoIP, . . . ).

In a MSMS device with a single receive-transmit (Rx-Tx) chain, subscriptions may accessing one or more shared radio frequency (RF) resources of the single Rx-Tx chain in order to monitor link information according to a variety of possible schemes that may avoid contention. In a MSMA device, access to shared radio resources may be managed to avoid contention and may allow all subscriptions to access respective service networks for periodic monitoring of link information. When originating a call on a multi-SIM device, however, the choice of which subscription to use may be challenging, particularly when radio environment conditions may change based on location, mobility, cost, power and other factors. Further, when engaged in a call on a first subscription, conditions for the call may degrade. Under ordinary circumstances, the caller may notice a degradation in the call quality and the call may ultimately drop. The caller may then attempt to reach the called party on an alternate subscription, but changing subscriptions may take time and, when a new call is made to the calling party, the new information associated with the alternate subscription may not be recognized by the called party and may not be accepted. Further, because the first call was dropped there is no convenient way to notify the called party that the caller will attempt the call using a new subscription or other means. As a result, the conversation may be significantly delayed until a new call may be arranged at a later time.

SUMMARY

The various embodiments include methods, as well as mobile devices and non-transitory media storing instructions implementing methods for enhancing call connectivity on multi-SIM mobile devices. An embodiment method of establishing a second call as a continuation of a first call on a multi-SIM communication device may include determining whether a quality of the first call between a calling party and a called party using a first subscription for a first network is degrading. Network alternatives may be provided for establishing the second call in response to determining that the quality of the first call is degrading. One of the network alternatives may be selected based on an order of suitability for establishing the second call. The called party may be notified using information associated with the calling party and the second call before the second call is originated. The information associated with the second call may identify the calling party to the called party before the second call is originated, for example, so that the called party may recognize that the call is continuation of the first call.

In a further embodiment method, the first call between the calling party and the called party using the first subscription may be discarded before the second call is originated. The selected one of the network alternatives for originating the second call may be activated. The second call between the calling party and the called party may be completed using the activated network alternative.

In a further embodiment method, the second call between the calling party and the called party may be completed using the selected one of the network alternatives. The first call between the calling party and the called party using the first subscription may be discarded when the second call is completed. In an embodiment method, an acceptance of the notifying the called party using information associated with the calling party and the second call may be received. In an embodiment method, it may be determined whether a quality of the first call using a first subscription is degrading by obtaining link quality information associated with the first call, and determining whether a value of the link quality information is below a threshold. The link quality information may include one or more of: a signal information to noise ratio (SINR), a received signal strength indicator (RSSI), a call quality index (CQI), and a transmit power level. An embodiment method may include selecting one of the network alternatives based on an order of suitability for originating the second call by displaying a list of the network alternatives in an order of suitability for originating the second call, and receiving the selection of the one of the network alternative from the list of network alternatives. An embodiment method may include selecting one of the network alternatives based on an order of suitability for originating the second call by automatically selecting one of the network alternatives from a list of the network alternatives arranged in an order of suitability for originating the second call.

An embodiment method may include notifying the called party using information associated with the calling party and the second call before the second call is originated by sending a notification to the called party including the information associated with the second call. Sending the notification may include sending a message using an application installed on a calling party device and a called party device. The application may include a messenger application, an instant messaging application, a social media application, or other application. Further in an embodiment method, the selected one of the network alternatives may include a second SIM of the multi-SIM communication device associated with a second network, and sending the notification comprises sending an SMS to the called party on the first network including the information associated with the second call. In an alternative embodiment method, when the selected one of the network alternatives includes a second SIM of the multi-SIM communication device associated with a second network, sending the notification may include sending an SMS to the called party on the second network including the information associated with the second call. In a further alternative embodiment method, the selected one of the network alternatives may include a wireless local area network (WLAN), the second call may include a voice over Internet Protocol (VoIP) call, and sending the notification may include sending a SIP INVITE to the called party on the WLAN including the information associated with the second call.

An embodiment method of continuing a first call on a multi-SIM communication device may include determining whether a quality of the first call between a calling party and a called party using a first subscription for a first network is degrading. An embodiment method may further include selecting a wireless local area network (WLAN) as a network alternative for continuing the first call in response to determining that the quality of the first call is degrading. An embodiment method may further include originating a voice over Internet Protocol (VoIP) session on at least a leg of the first call between the calling party and the first network using the WLAN. An embodiment method may further include continuing the first call using the originated VoIP session.

Further embodiments may include an apparatus for establishing a second call as a continuation of a first call, or continuing a first call, on a multi-SIM communication device, having a memory, a plurality of radio frequency (RF) chains, a plurality of subscriber identity modules (SIMs) associated with a plurality of network subscriptions, and a processor coupled to the memory, the plurality of RF chains, and the plurality of SIMs, in which the processor is configured with processor-executable instructions to perform various operations corresponding to the methods discussed above.

Further embodiments may include an apparatus for establishing a second call as a continuation of a first call, or continuing a first call, on a multi-SIM communication device having a plurality of subscriber identity modules (SIMs) associated with a plurality of network subscriptions, and various means for performing functions corresponding to the method operations discussed above.

Further embodiments may include a non-transitory computer readable storage medium having stored thereon processor-executable software instructions configured to cause a processor of a multi-SIM communication device to perform operations for establishing a second call as a continuation of a first call, or for continuing a first call, corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 2A is a table illustrating an embodiment of establishing suitability ranking among alternatives in multi-subscription device.

FIG. 2B is a chart further illustrating an embodiment of establishing suitability ranking among alternatives in multi-subscription device.

DETAILED DESCRIPTION

Figure 1A:
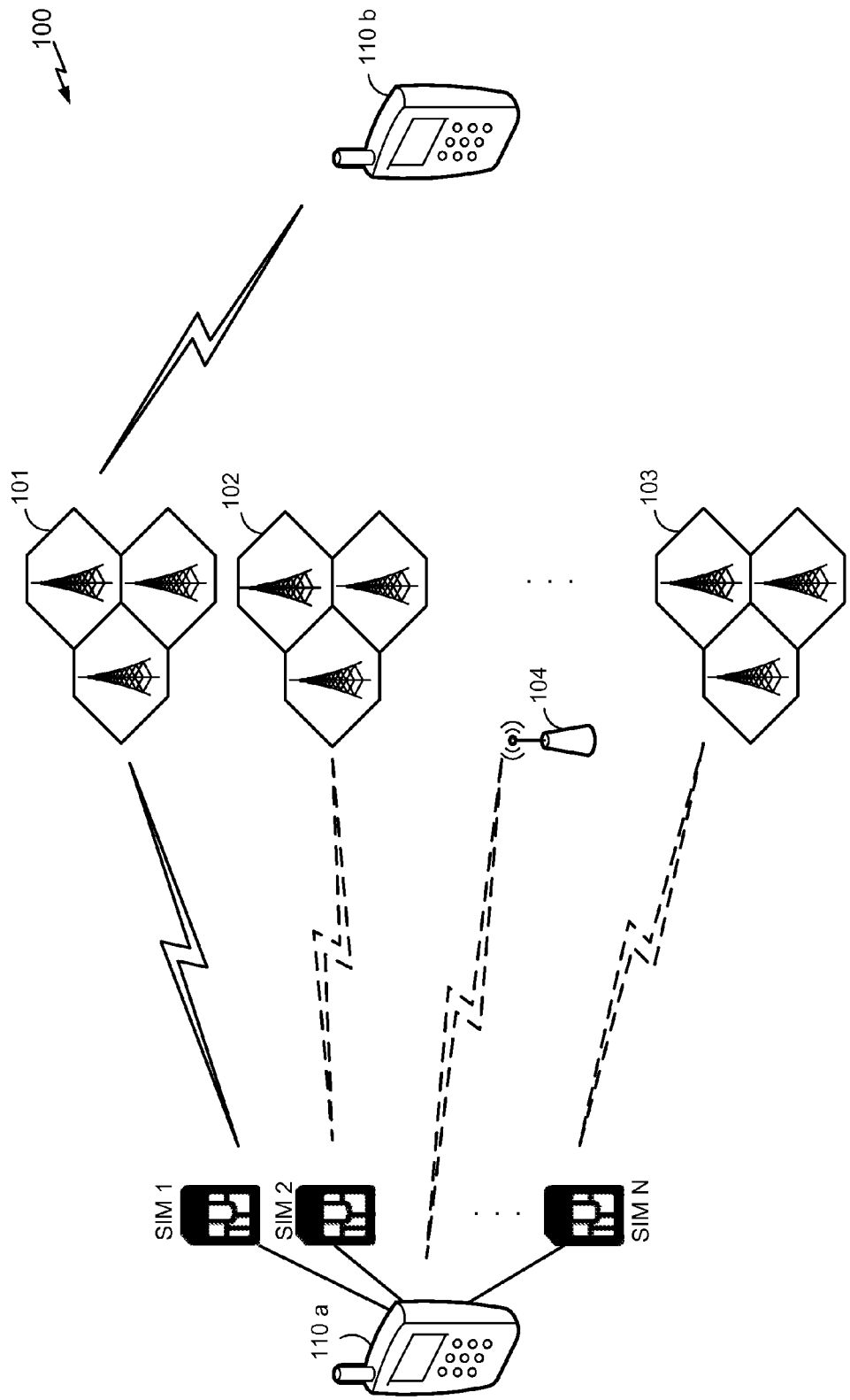
FIGS. 1A and 1B are communication system block diagrams illustrating communication links in various embodiments.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of mobile media broadcast receivers, cellular telephones, personal television devices, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, receivers within vehicles (e.g., automobiles) and similar personal electronic devices which include a programmable processor and memory, controller or controller, digital signal processor or processors or other signal processing resources.

The term "multi-SIM communication device" and "multi-SIM device" are used interchangeably herein to refer to any one or all of cellular telephones, smartphones, personal or mobile multi-media players, laptop computers, tablet computers, smartbooks, ultrabooks, palm-top computers, wireless electronic mail receivers, multimedia Internet enabled cellular telephones, and similar personal electronic devices that include two or more subscriber identity modules (SIM), a memory, and a programmable processor.

The various embodiments include methods that may be implemented in a multi-SIM communication device for establishing a second call during a first call including determining that a first call between a calling party and a called party is degrading, providing network alternatives for establishing a second call in response to determining that the first call is degrading, selecting a subscription or network alternative for completing a first call from a ranked list of subscriptions and network alternatives based on quality-related factors and other factors such as cost. Selection of the subscription or network alternative for completing the call may be performed manually by a user of a multi-subscription device or may be performed automatically by the multi-subscription device. The ranking of the alternatives and the selection of one of the alternatives may be based on established criteria or may be based on ad-hoc criteria. Further, during a first call, conditions may degrade, whereupon a revised list of suitable alternatives may be made available for selecting an alternative for a second call. The selection of the alternative for the second call may be made manually or automatically by the multi-subscription device. When the second alternative is selected, the called party may be intimated or notified of the second call, by sending a notification to the called party of the second call. The notification of the second call my include information about the calling party such that the called party may know that the second call is from the calling party and represents a continuation of the conversation or session associated with the first call, which is degrading.

The subscription and network alternatives may share signal processing resources and radio resources (e.g., RF resources) in devices that support multiple subscriptions (e.g., multi-subscription devices) such that the subscriptions may periodically monitor link quality related parameters associated with the subscription networks or other networks. As an example, a device that supports multiple subscriptions (e.g., a MSMS device) may share one receive-transmit (Rx-Tx) chain. Each subscription may request RF resources to accomplish monitoring and the multi-subscription device may maintain current information regarding factors such as call quality, transmit power, signal information to noise ratio (SINR) and other link quality related parameters. Information regarding other factors may also be maintained, such as service costs, quality of service (QoS) and other information for each alternative.

Embodiment methods for providing multi-subscription diversity and enhanced call connectivity alternatives a multi-subscription device may be implemented within a variety of cellular and mobile communication systems, an example of which is illustrated in FIG. 1A and generally designated 100. The system 100 includes a multi-SIM communication device 110*a* that supports multiple subscriptions (e.g., a mobile telephone or other communication device). For example, each subscription may be associated with its own user identity module (UIM), such as a subscriber identity module (SIM), a code division multiple access (CDMA) removable UIM (R-UIM), or other type of R-UIM. In the embodiment illustrated in FIG. 1, the multi-SIM communication device 110*a* is capable of receiving multiple SIMs such as SIM1, SIM2, . . . , SIM N. Each SIM is associated with a subscription to a service network such as network 101, 102 and 103. The multi-SIM communication device 110*a* may further have the capability to connect to a non-telephone wireless local area network (WLAN) 104 that provides access to the Internet, such as a WiFi network. In the embodiment illustrated in FIGS. 1A-1C, the multi-SIM communication device 110*a* may be capable of making a call to another telephone device 110*b*, such as through the service network 101 using the services associated with SIM 1. The other telephone device 110*b* may any device capable of receiving a telephone call, such as a conventional land-line telephone and a cellular telephone. In the various embodiments, the subscription to be used for the call may be selected based on suitability of a subscription based on information including priority, transmit power, cost, and other factors that will be described hereinafter. In the present illustrative example, for ease of description, the first network 101 may be used to make the first call.

Figure 1B:
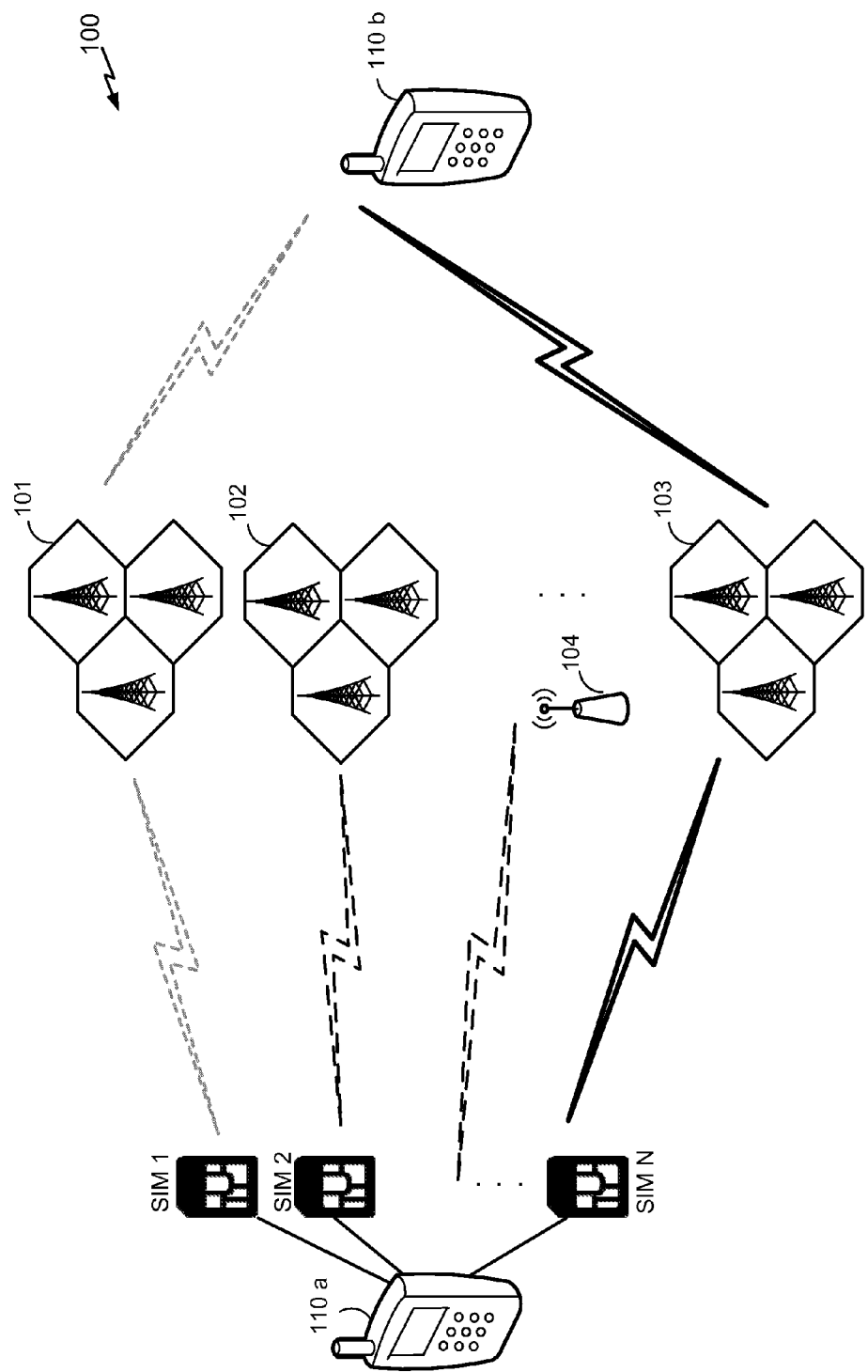

When conditions of the first call established using the first network 101 and the SIM 1 degrade, in embodiments, such as may be illustrated in FIG. 1B, a second call to the called party associated with the other telephone device 110*b* may be advantageously set-up on an alternative service network, such as service network 103 using SIM N, which may be selected as most suitable based on various factors as will be described. Alternatively, a wireless local area network may be used for the second call. The second call may be intimated to the called party, as will also be described in greater detail hereinafter, such that the called party may know or recognize that the second call is from the calling party and may be a continuation of the first call. In some embodiments, the second call may be set up before the first call is dropped, discarded or otherwise ended, advantageously preserving the continuity of the conversation or session of the first call. In embodiments where the first call must be discarded before the second call is completed, the latency of establishing the second call may be reduced to a degree that the continuity of the conversation or session may nevertheless be maintained at an acceptable level.

Figure 1C:
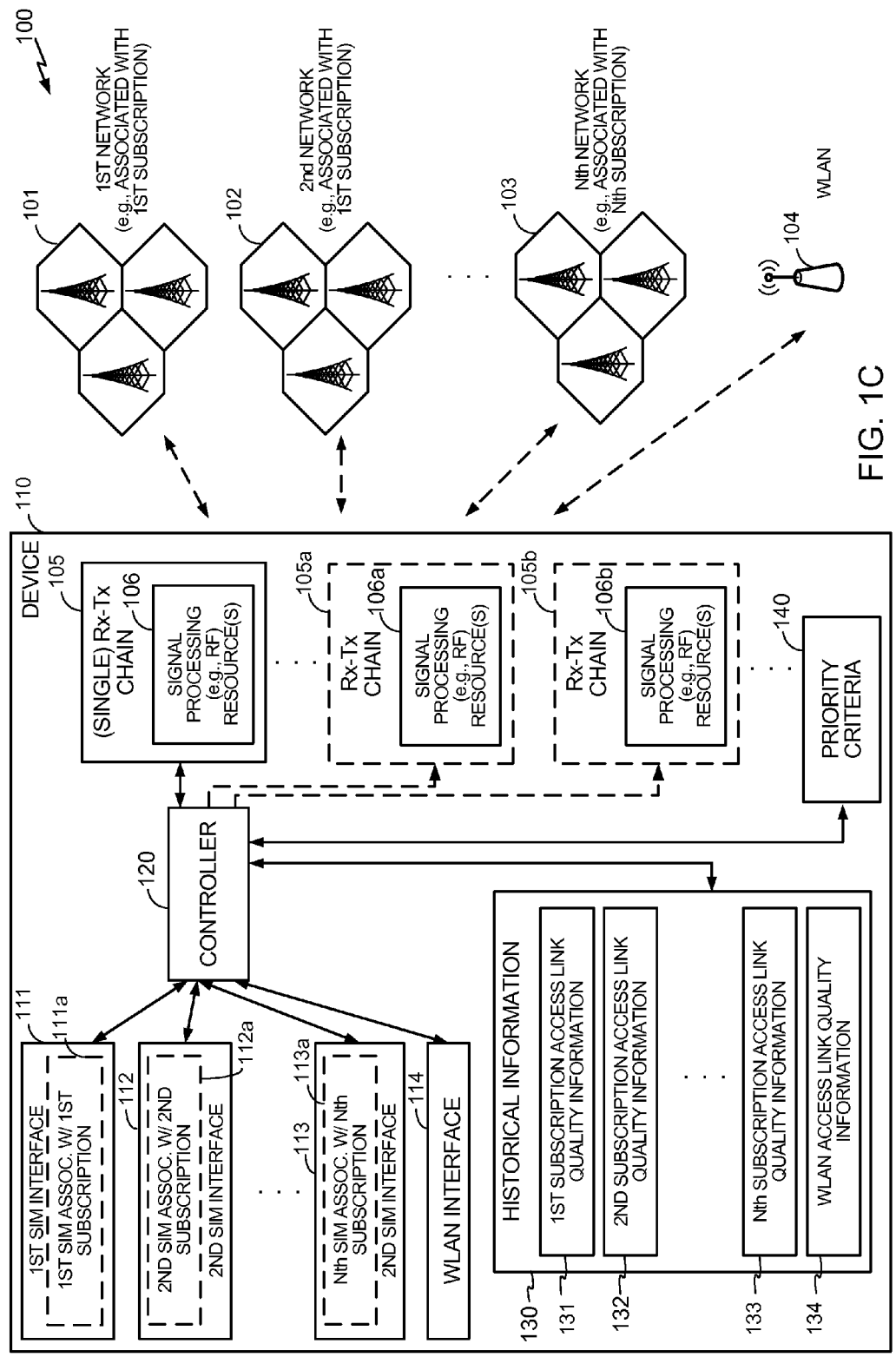
FIG. 1C is a diagram illustrating an embodiment of a multi-subscription device.

In an embodiment illustrated in FIG. 1C, a multi-SIM communication device 110*a* may be a multi-SIM multi-standby device with a single receive-transmit (Rx-Tx) chain 105 that includes at least one signal processing (e.g., RF) resource 106. In other embodiments, the multi-SIM communication device 110 may be a multi-SIM multi-active device with additional receive-transmit (Rx-Tx) chains 105*a* and 105*b* and possibly additional Rx-Tx chains. The multi-SIM communication device 110 includes a first SIM interface 111 configured to receive a first SIM 111*a* that is associated with a first subscription (e.g., a subscription associated with a first network 101), a second SIM interface 112 to receive a second SIM 112*a* that is associated with a second subscription (e.g., a subscription associated with a second network 102) and a Nth SIM interface 113 configured to receive an Nth SIM 113*a* that is associated with an Nth subscription (e.g., a subscription associated with an Nth network 103. The multi-SIM communication device 110 may further be capable of connection, through a network interface 114, to a wireless network such as WLAN network 104. Alternatively, two or more of the subscriptions may be associated with the same network. The SIMs 111*a*, 112*a* and 113*a*, may further be inserted into or otherwise connected to alternate ones of the respective SIM interfaces 111, 112 and 113. The first SIM interface 111, the second SIM interface 112, the Nth SIM interface 113, the WLAN interface 114, and a controller 120 may be communicatively coupled to the signal processing resource 106 (e.g., via electrical connections between the SIM interfaces 111-114, the controller 120, and the signal processing resource 106). In a multi-SIM, multi-active embodiment, signal processing resources 106*a* and 106*b* may also be used.

To illustrate, a first electrical connection between the first SIM interface 111 and the signal processing resource 106 may provide a communication path between the first SIM 111*a* and the signal processing resource 106 when the first SIM 111*a* is inserted into or otherwise connected to the first SIM interface 111. As another example, a second electrical connection between the second SIM interface 112 and the signal processing resource 106 may provide a communication path between the second SIM 112*a* and the signal processing resource 106 when the second SIM 112*a* is inserted into or otherwise connected to the second SIM interface 112. As another example, additional electrical connections between additional SIMs, such as the Nth SIM interface 113 and the signal processing resource 106 may provide additional paths, such as a communication path between the Nth SIM 113*a* and the signal processing resource 106 when the Nth SIM 113*a* may be inserted into or otherwise connected to the Nth SIM interface 113. Thus, SIMs 111*a*-113*a* and a wireless network module, may be concurrently connected to the signal processing resource 106 (e.g., via the SIM interfaces 111-113 and the WLAN interface 114).

The controller 120 may be configured to receive requests to access the signal processing resource 106 during a time period. At least one of the requests may be related to the first subscription (e.g., associated with the first SIM 111), at least one of the requests may be related to the second subscription (e.g., associated with the second SIM 112), at least one of request may be related to the Nth subscription (e.g., associated with the Nth SIM 113) and at least one of the requests may be related to accessing the network through the WLAN interface 114. During the time period, the controller 120 is configured to grant access to the signal processing resource 106 to the various subscriptions and network modules, for example according to a priority or other mechanism that may be useful to avoid collisions or contention. Link information, such as link-quality related information, may be obtained when the various subscriptions and network module are connected to respective networks such as the first network 101, the second network 102, the Nth network 103 and the WLAN 104.

During operation of the multi-SIM communication device 110, the controller 120 may be configured to receive addition requests to access the signal processing resource 106 during additional time periods or other access opportunities. The controller 120 may require a mechanism to avoid contention between the various subscriptions. As access is granted to the various subscriptions and network module or modules, the controller 120 is configured to build and store information, such as historical information 130 related to access to the signal processing resource 106 by the various subscriptions and network module. Subscription access link quality information may be stored in association with each subscription and network. For example, link quality information regarding the first subscription may be stored as a first subscription link access quality information 131, link quality information regarding the second subscription may be stored as a second subscription link access quality information 132, link quality information regarding the Nth subscription may be stored as a Nth subscription link access quality information 133 and link quality information regarding the network 104 may be stored as a WLAN link access quality information 134.

During operation of the system 100 of FIG. 1C, link quality information may be obtained during access by the various subscriptions, such as by making signal measurements on incoming network signals. The controller 120 may receive requests to access the signal processing resource 106 during a time period as described. To illustrate, the controller 120 may receive a request from the first subscription to access the signal processing resource 106 (e.g., an RF resource) in order to receive an incoming page (not shown in FIG. 1C) from the first network 101. The controller 120 may receive another request from the second subscription to access the signal processing resource 106 in order to receive an incoming page (not shown in FIG. 1C) from the second network 102. The controller 120 may receive another request from additional subscriptions, such as the Nth subscription to access the signal processing resource 106 in order to receive an incoming page (not shown in FIG. 1C) from the Nth network 103. The controller 120 may receive another request from the network module to access the signal processing resource 106 in order to receive an incoming page or other signal, such as beacon signal (not shown in FIG. 1C) from the WLAN 104. In response to the access requests, the controller 120 may grant access to the signal processing resource 106 to various subscriptions, for example, according to a priority mechanism or other mechanism, such that incoming pages or signals may be received from the respective networks.

The controller 120 may determine, based on the historical information 130, which of the subscriptions is most suitable for making calls including the first call and the second call, and addition calls as required. The controller 120 may generate and maintain a list of subscriptions and networks in an order of suitability or priority. In a particular embodiment, a numeric priority may be associated with the various subscriptions based on the historical information 130 as related, for example, to the subscription access link quality information 131-134 for each of the subscriptions. The historical information may include the most recent link quality information measured or obtained by the subscriptions during access periods. The list of suitable subscriptions and networks may also be adjusted, updated and otherwise informed by currently obtained (e.g., real-time) measurements and information, such as may be related to the link quality.

When a call is being placed or originated, such as a mobile originated (MO) call, the controller 120 may refer to the list of subscription or network alternatives for the call, which may be arranged in an order of suitability or numeric priority. Priority criteria 140 may be used to determine how comparative measurements should be ranked against each other and how factors such as cost may be used to change or adjust the priority or suitability ranking for a subscription or network. The highest priority alternative, which may correspond to the most suitable alternative for the call, may be selected for completing the call. The alternative may be selected by a user of the multi-SIM communication device 110 or may be automatically selected. During the first call, the list may be maintained for ordering the alternatives for additional calls. To illustrate, an example ranking scenario 200, may include the generation of a link priority list 210 is illustrated in FIG. 2A. The link priority list 210 may contain a numeric priority or ordering associated with which of the alternatives are most suitable for completing the call. The left-most column 211 in the link priority list 210 of FIG. 2A may contain a heading for each subscription or network, with corresponding rows representing link quality related and other parameters for each subscription or network. Individual columns illustrate representative headings for information such as link quality related information and other information for each subscription or network. Information associated with each of the networks listed in the column 211 of the link priority list 210 may include a signal information to noise ratio (SINR) 212, which in some examples may be expressed in decibels (dB). The link priority list 210 may include a column for a cost 213 for each subscription or network, which in some examples may be expressed as a relative index from 0 (e.g., least costly) to 10 (e.g., most costly). The link priority list 210 may include a column for a transmit power (PWR) 214, which may be expressed as a relative index of a transmit power in dB, mW, or other value between the alternatives. The link priority list 210 may include a channel quality indicator (CQI) 215, which may be expressed as a relative index of call quality from 1-15 between alternatives. The link priority list 210 may further include a received signal strength indicator (RSSI) 216, which may be expressed as a value in dB referenced to 1 mW (dBm) between alternatives. While examples of metrics used to establish suitability, priority, or ranking are shown and described in connection with the link priority list 210, other metrics are possible.

In embodiments, various considerations may be given to establish the values in the link priority list 210. For example, the SINR 212 may be established as a SINR value that is above a minimum SINR threshold for a sufficient amount of time. Generally, a link having the best value for the SINR 212 may be most suitable for selection. The index associated with cost 213 may be representative of the relative cost between alternatives based on charges associated with the respective subscriptions. For a wireless network, such as WLAN 104, charges may be at or close to zero. The value or index associated with the PWR 215 and the RSSI 216 may be based on internal measurements by the multi-SIM communication device 110, such as may ordinarily be performed in connection with generating a measurement report.

In the present example, it may be assumed for ease of discussion, that the first network 101 associated with the first subscription was selected based on having the best suitability, highest priority, or preferred ranking for the first call, and a call on the first network 101 using the first subscription may be established. As illustrated in FIG. 2A, the ranking of the subscriptions and networks may be established such that the subscription N, associated with Nth network 103 may be the highest ranking alternative followed by the WLAN 104 and the second network 102. Although the Nth subscription has superior values for the SINR 212, and the CQI 215, the WLAN 104 has slightly superior values for the cost 213, the PWR 214 and the RSSI 216. The SINR 212 may be selected, such as during a setup procedure, as having a greater weight in establishing rankings. A user may nevertheless select, during a manual selection procedure, a different alternative for completing a call based on factors other than the SINR 212, such as the cost 213.

Further in the present example, during the pendency of the first call, the call quality of the first subscription may degrade and a second call may be advantageously established, in embodiments that will be described in greater detail below, to select the next most suitable alternative. In the present example, it may be assumed that the subscription N, which was indicated in the link priority list 210 as being the next most suitable alternative for a call, may be selected. During operation of the multi-SIM communication device 110, additional measurements may be made for each of the subscriptions 111a-113 and the WLAN interface 114 and rankings may be changed in a ranking update scenario 205 as illustrated in FIG. 2B, and an updated link priority list 210a may be generated. The ranking of subscriptions for the networks 211a may be changed based on changes in the various ranking factors such as a SINR 212a, a cost 212a, a PWR 213a, a CQI 215a and a RSSI 216a. In the updated ranking reflected in the updated link priority list 210a, the WLAN 104 may become the most suitable alternative having superior rankings in all of the factors, such as the SINR 212a, the cost 213a, the PWR 214a, the CQI 215a and the RSSI 216a. Thus in embodiments, an up-to-date list of the relative priorities may be available so that the most suitable subscription may be selected, either manually or automatically for a call. The call may be a first call or may be a second call or additional call that is originated when a first call quality is degraded. Further in the present example, during the pendency of the first call, the call quality of the first subscription may degrade and a second call may be established, as will be described in greater detail below, to select the next most suitable alternative.

Figure 3A:
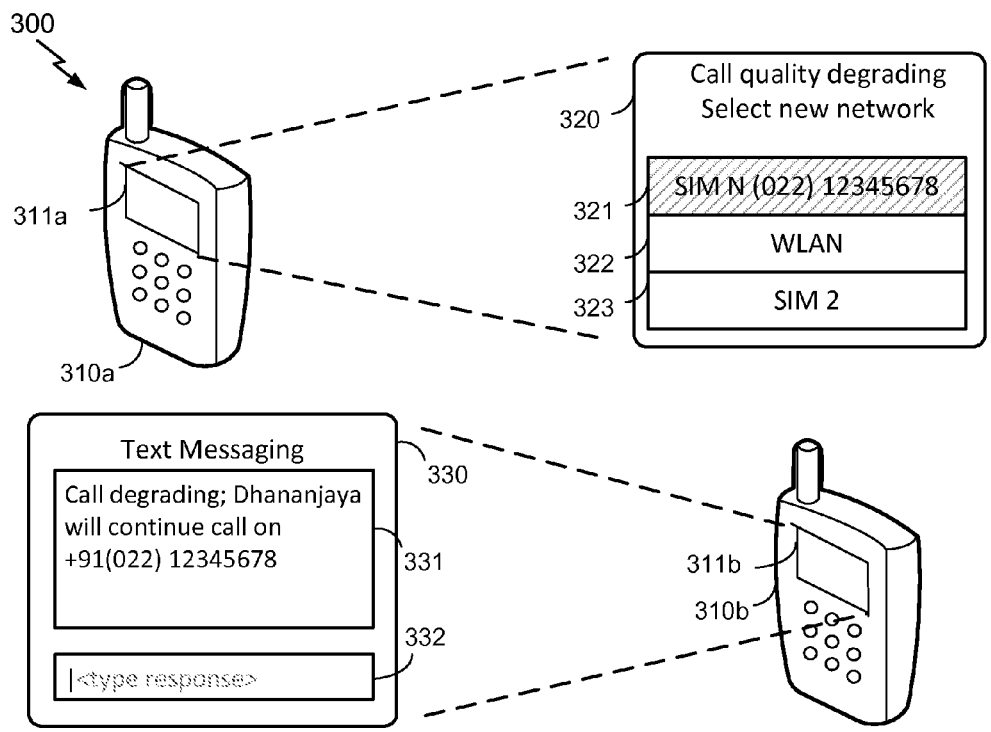
FIG. 3A is a diagram illustrating an embodiment of displaying alternatives and displaying a messaging notification on a display.

FIG. 3A illustrates an example of selecting an alternative for a second call on a display 311a of a calling party device 310a, such as a multi-SIM communication device, and displaying a notification of a selection of an alternative on a display 311b of a called party device 310b. The calling party device 310a may determine that a first call is degrading, whereupon a display window 320 may be presented on the display 311a of the calling party device 310a. The display window 320 may contain a list of alternatives for placing a second call such as SIM N 321, WLAN 322 and SIM 2 323. For ease of discussion, a hypothetical telephone number associated with the Nth subscription is shown, e.g. (022) 12345678. The telephone number is presumably different from the telephone number associated with the first call. When the network alternative is selected, such as SIM N 321, a notification message may be sent to the called party through, for example, an SMS message as described herein. On a display window 330, which may be presented on the display 311b of the called party device 310b, the SMS message may be received and presented in a message window 331 indicating the calling party and the calling party number, such that when the second call is placed the called party may recognize the incoming call and recognize that it is a continuation of the first call in response to degradation of the first call. In various embodiments, the called party may provide an acceptance of the message by typing a response in a text entry window 332. The message displayed in the message window 331 may be automatically generated, or may be entered manually by a user of the calling party device 310a. When the calling party device 310a is configured for automatic selection of the alternative for the second call, the message may be automatically generated.

Figure 3B:
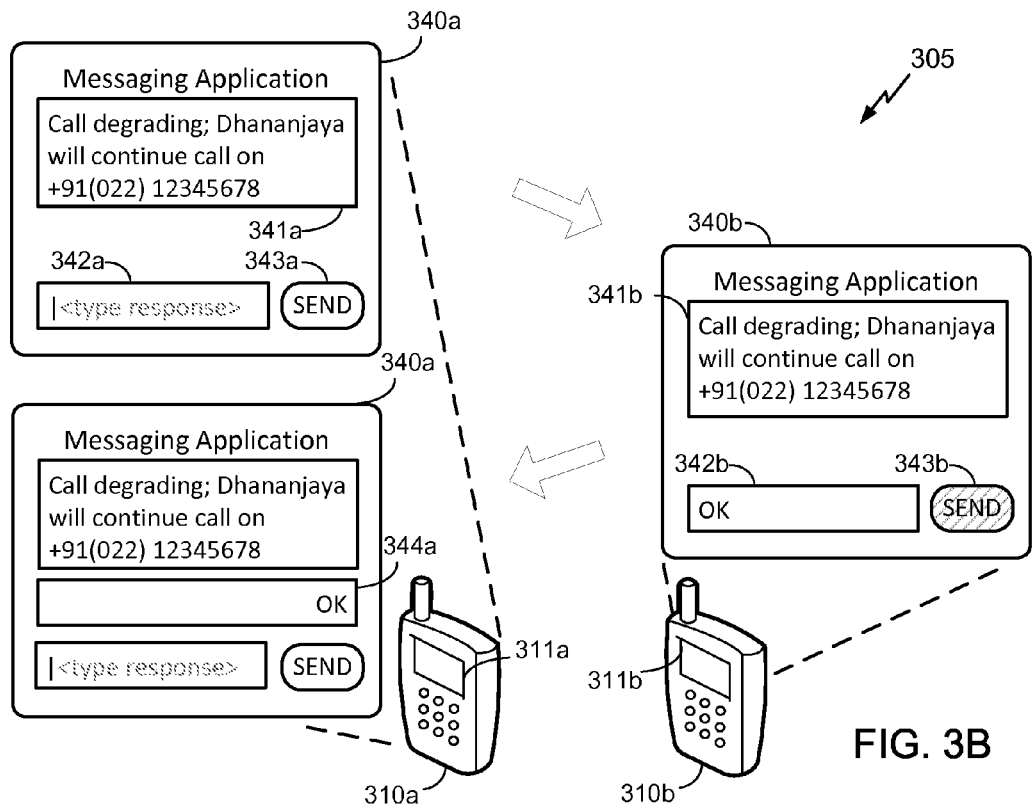
FIG. 3B is a diagram illustrating an embodiment of an application for providing notification on a display.

In another embodiment illustrated in FIG. 3B, a notification of a second call may be provided using an application that is installed and operative on the calling party device 310a and the called party device 310b, such as a messaging application 340. General examples of messaging application may include Instant Messaging (IM) applications, messenger applications, chat applications, social media applications, and other applications that are capable of being installed on devices of calling and called parties to provide network based messages. In some embodiments, the application may provide a pop-up message that will appear as a top level window on the display of the receiving party regardless of what activity the user of the receiving party is engaged in. On the calling party side, the messaging application 340a may be used to generate, either automatically or manually a message 341a that indicates at least the calling party name information and the calling party number information. The message 341a may be entered using a text entry window 342a and may be sent with a send button 343a. The message 341a may be received at the called party device 310b and displayed using the messaging application 340b. A message 341b may appear in the display window of the application 340b indicating the calling party name information and calling party number information. The called party may enter a response "OK" in a text entry window 342b and send the response using the send button 343b. The response may be received by the calling party and displayed as a message 344a in the display window of the messaging application 340a.

Figure 4A:
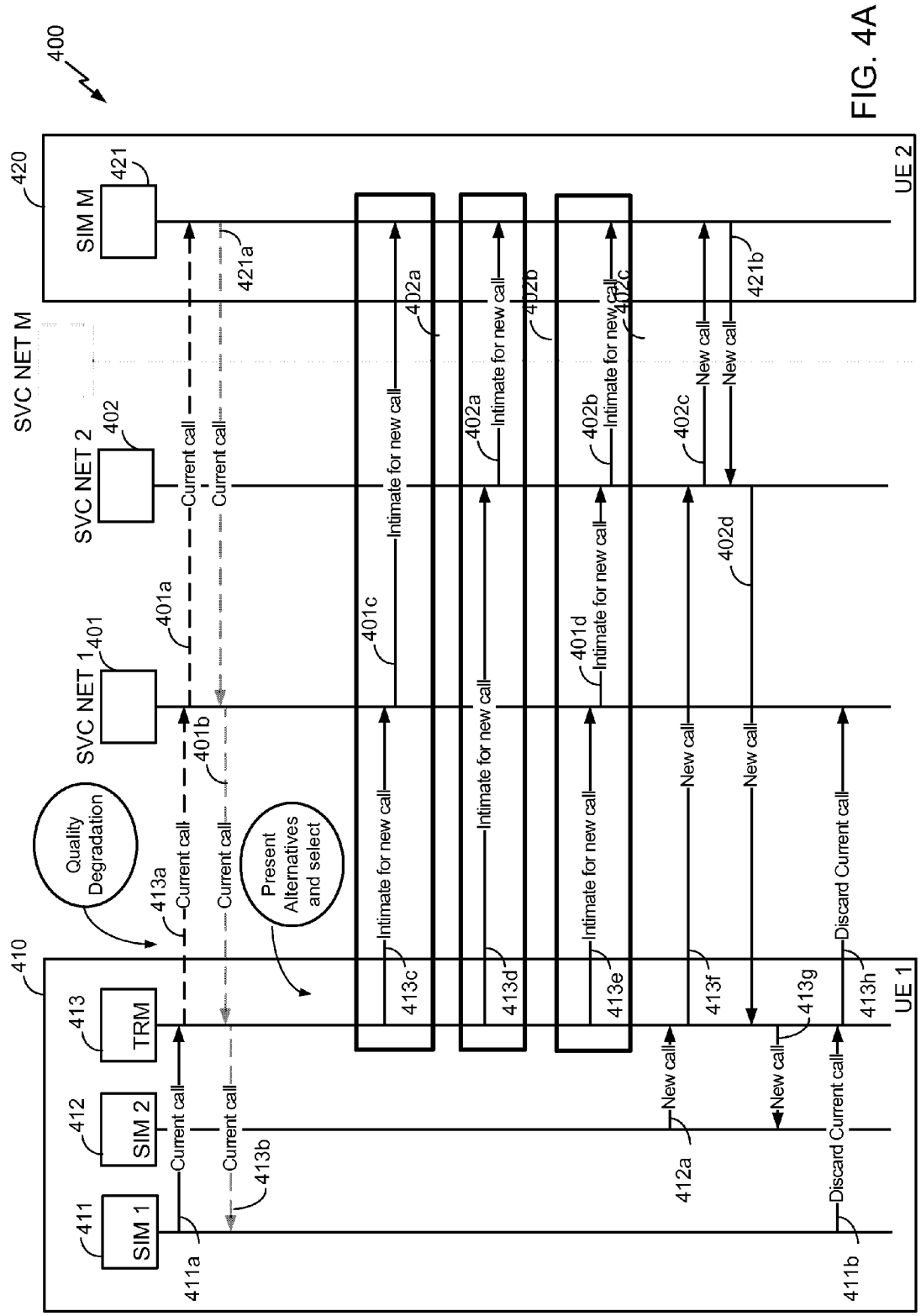
FIG. 4A is a call flow diagram illustrating an embodiment of performing an intimation and setup of a call using an alternative subscription in a multi-subscription device.

The call flow diagram in FIG. 4A illustrates an embodiment generally designated 400 for intimating a second call from a device 410, such as a multi-SIM device when a first call is in progress and degrading in quality. The multi-SIM communication device 410 may have previously established a call based on the link priority list 210, or the updated link priority list 210a as previously described. The calling party side of the first call may be represented, for example, as a leg 411a of a current call initiated from the first SIM 1 411 through a transmit resource module (TRM) 413. The TRM 413 may establish and maintain a leg 413a of the current call to the first service network 401. The first service network 401 may establish and maintain a link 401a of the current call to a UE 420 associated with the called party based on a subscription associated with a SIM M 421, which may be a subscription to any network, such as a network M. The UE 420 may be connect to or routed to by way of interactions with a network, such as the network M, which may be may be associated with a home location. Alternatively, the network M may be a local or visited network. In various embodiments, the UE 420 may be a single subscription or multi-subscription device including a subscription to the first network, the second network, or other network. Detailed call related interaction between the network M associated with the UE 420, when different from the first network 401 or the second network 402, is omitted for ease of description. The UE 420 may establish and maintain the called party side of the current call with the multi-SIM communication device 410, for example, through a leg 421a to the service network 401 and a leg 401b to the TRM 413 and a leg 413b to the SIM 1 411.

During the current call, a quality degradation may occur associated with the first SIM 1 411. Determining that the call quality of the first call is degrading may be performed relatively rapidly by various mechanisms associated with measuring or monitoring signal quality related information in the multi-SIM communication device 410 and/or the first network 401. When it is determined that the current call is degrading, the link priority list 210 or the updated link priority list 210a may be presented and a selection may be made for an alternative with which to originate a second call or new call. Presenting the list may include making the list available to the multi-SIM communication device 410 for automatic selection based on suitability or priority. Presenting the list may also include displaying the alternatives to the user on a display of the multi-SIM communication device 410 and the alternative may be selected based on suitability or priority or the user may select any alternative. When the alternative for the second call is selected, the multi-SIM communication device 410 may intimate the second call to the UE 420. Intimation of the new call may involve sending a notification to the UE 420 including information associated with the calling party, e.g. device 410. The information may include the name of the calling party, the new number of the calling party on the new network for the new call, and other information that may assist the called party, e.g. UE 420, in identifying that the new call is from the calling party.

In embodiments, the intimation or notification may be performed by sending a short message service (SMS) message from the calling party to the called party on the network of the current call. Alternatively, other messaging mechanisms may be used such as enhanced messaging service (EMS), multimedia messaging service MMS, wireless application protocol (WAP) push messaging, or other messaging mechanism. In other embodiments, the intimation or notification may be performed using other mechanism, such as mechanisms that may be implemented in the networks including the network for the current call, the network for the new call, or other network services mechanism. In some embodiments, an application, including application that uses internet based messaging, that is executing on both the calling party device and the called party device may be used for the intimation or notification. Such an application may allow sending and receiving pop-up messages or alerts, including internet-based message mechanisms (e.g., http), that may indicate, for example to the called party that the calling party will attempt a second call on a second network, WLAN or other network alternative. Other messaging alternatives may include instant messaging (IM) applications or services and social media applications or services.

In one example, a leg 413c for the intimation may be established to the first network 401, and a leg 401c for the intimation may be established to the UE 420 to provide the intimation or notification. In another example, a leg 413d may be established to a network selected for the new call, such as a second network 402. A leg 402a may be established to the UE 420 to provide the intimation or notification. In still another example, a leg 413e may be established to the first network 410, a leg 401d established to the second network 402, and a leg 402b established to the UE 420 to provide the intimation or notification. In still other examples, networks or mechanisms other than the first network 401 and the second network 402 may be used to provide the intimation or notification.

When the intimation or notification has been sent to the called party, such as the UE 420, a new call may be established using the selected alternative, such as a second subscription SIM 2 412. The SIM 2 412 may establish a leg 412a of the new call with the TRM 413. A leg 413f of the new call may be established with the second network 402. A leg 402c may be established with the UE 420. The UE when receiving the incoming call may recognize that the call is from the calling party, e.g., device 410, based on the intimation and accept the call. A leg 421b may be established between the UE 420 and the second network 402. A leg 402d may be established between the second network 402 and the TRM 413 of the multi-SIM communication device 410. And the new call may be established with a leg 413g through the SIM 2 412.

In the present and other examples, the SIM 1 411 and the SIM 2 412 and the TRM 413 are described in connection with, for example, establishing and maintaining the current call and new call in various embodiments. However, other elements and modules that are not specifically illustrated and described may be required for completing the call in accordance with communication protocols and methods depending on the type of networks and services associated with the multi-SIM communication device 410, the UE 420, the first network 401, the second network 402 and other networks. Further, the elements such as SIM 1 411 and SIM 2 412, may perform functions that are directly or indirectly related to call processing, while other elements, processors, modules, or resources may be required to perform various call related functions. In the present example, when the multi-SIM communication device 410 includes a MSMA device or other device that may allow the new call to be established while the current call is in progress, the current call may be discarded and the conversation or session between the multi-SIM communication device 410 and the UE 420 may be continued or resumed on the new call. To discard the current call, the user may terminate or end the call, or may switch to the new call, through interaction with a user interface associated with the multi-SIM communication device 410. The SIM 1 411 may signal on a leg 411b to the TRM 413, for example, to release radio resources or take other steps to end the current call. The TRM 413 may signal on a leg 413h to the first network 401 to discard the call. Further signaling by first network to the UE 420, or to a service network, such as network M, associated with the UE 420 is omitted for ease of description.

Figure 4B:
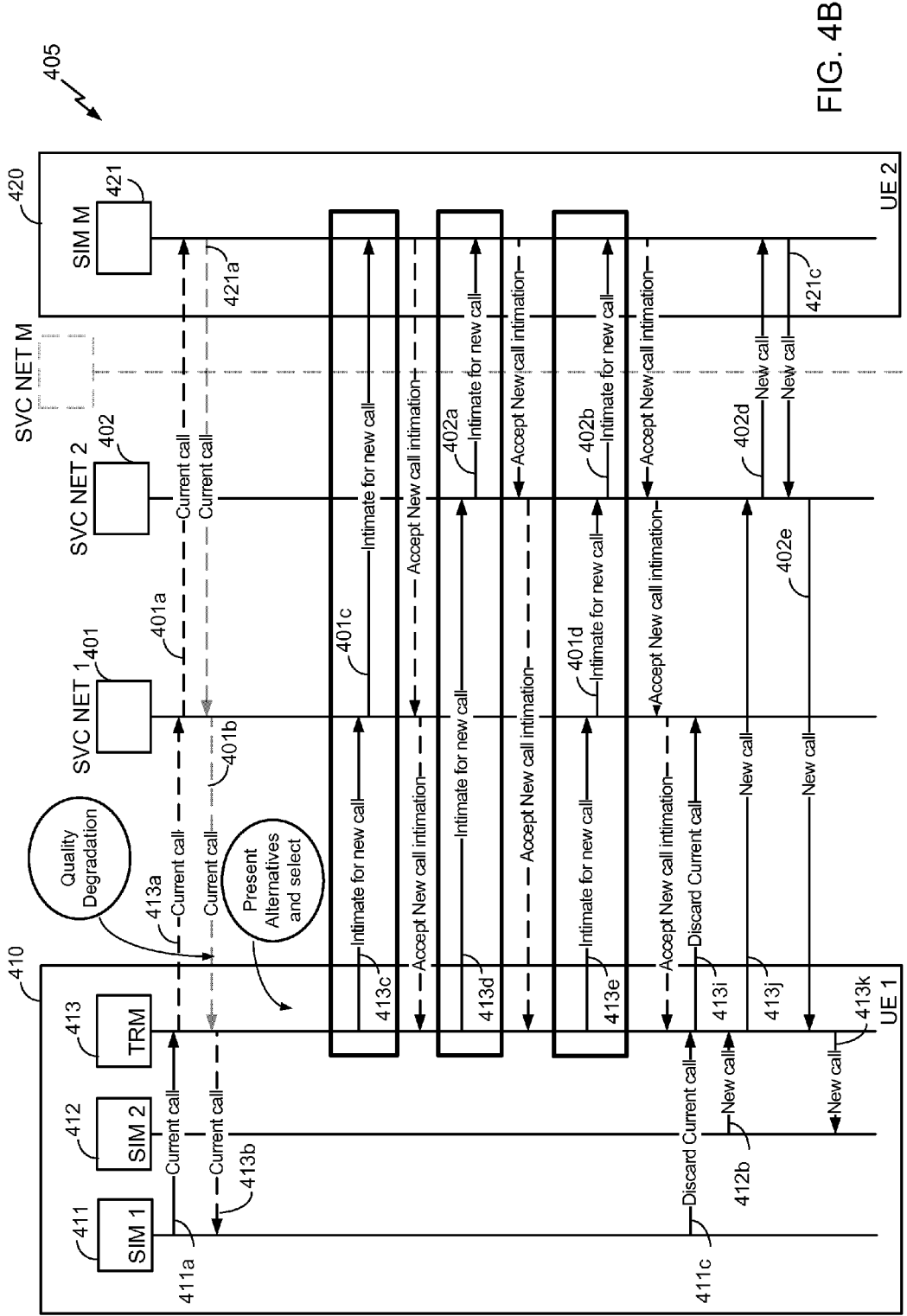
FIG. 4B is a call flow diagram further illustrating an embodiment of performing an intimation and setup of a call using an alternative subscription in a multi-subscription device.

FIG. 4B includes a call flow diagram illustrating communications implementing another embodiment generally designated 405, for intimating a second call from a device 410, such as a multi-SIM device, and, more specifically, a device that allows one active subscription. In the illustrated example, a second call may be intimated when a first call is in progress and degrading in quality. As with the example illustrated in FIG. 4A, the multi-SIM communication device 410 may have previously established a call based on the link priority list 210, or the updated link priority list 210a as previously described. The calling party side of the first call may be represented, for example, as a leg 411a of a current call initiated from the first SIM 1 411 through the TRM 413. The TRM 413 may establish and maintain a leg 413a of the current call to the first service network 401. The first service network 401 may establish and maintain a link 401a of the current call to a UE 420 associated with the called party based on a subscription associated with a SIM M 421, which may be a subscription to any network, such as the network M. The UE 420 may be connect to or routed to by way of interactions with a network, such as the network M, as described above in connection with FIG. 4A, details of which interactions are omitted for ease of description. The UE 420 may establish and maintain the called party side of the current call with the multi-SIM communication device 410, for example, through a leg 421a to the service network 401 and a leg 401b to the TRM 413 and a leg 413b to the SIM 1 411.

During the current call, a quality degradation may occur associated with the first SIM 1 411. The call degradation may be detected as described above in connection with FIG. 4A. When it is determined that the current call is degrading, the link priority list 210 or the updated link priority list 210a may be presented and a selection may be made for an alternative with which to originate a second call or new call. Presenting the list may include making the list available to the multi-SIM communication device 410 for automatic selection based on suitability or priority. Presenting the list may also include displaying the alternatives to the user on a display of the multi-SIM communication device 410 and the alternative may be selected based on suitability or priority or the user may select any alternative. When the alternative for the second call is selected, the multi-SIM communication device 410 may intimate the second call to the UE 420, as also described above with reference to FIG. 4A. In the present example, an acceptance message or notification may be returned to the multi-SIM communication device 410 through the first network 401, the second network 402, or a combination of the first network 401 and the second network 402.

When the intimation or notification has been sent to the called party of the current call, such as the UE 420, and an acceptance message or notification is received from the called party by the calling party, such as the multi-SIM communication device 410, the current call may be discarded. In a device, such as a MSMS device, in which only one subscription may be active, the current call may be discarded in order for the new call to be established. To discard the current call, which may involve the user terminating or ending the call through interaction with a user interface associated with the multi-SIM communication device 410, the SIM 1 411 may signal on a leg 411b to the TRM 413, for example, to release radio resources or take other steps to end the current call. The TRM 413 may signal on a leg 413i to the first network 401 to discard the call. Further signaling by and between the first network 401 and the UE 420, or a service network, such as network M, associated with discarding the call on the called party side, such as the UE 420, is omitted for ease of description.

The new call may be established using the selected alternative, such as a second subscription SIM 2 412. The SIM 2 412 may establish a leg 412b of the new call with the TRM 413. A leg 413j of the new call may be established with the second network 402. A leg 402d may be established with the UE 420. Based on the previously accepted intimation, the UE 420, when receiving the incoming call may recognize that the call is from the calling party, e.g., device 410, and accept the new call. A leg 421c may be established between the UE 420 and the second network 402. A leg 402e may be established with the TRM 413 of the multi-SIM communication device 410. And the new call may be established with a leg 413k through the SIM 2 412. In the present example, when the multi-SIM communication device 410 includes a MSMS device or other device that may not allow the new call to be established while the current call is in progress, the current call may be discarded first before the new call is established. When the new call is established the conversation or session between the multi-SIM communication device 410 and the UE 420 may be continued or resumed on the new call.

Figure 4C:
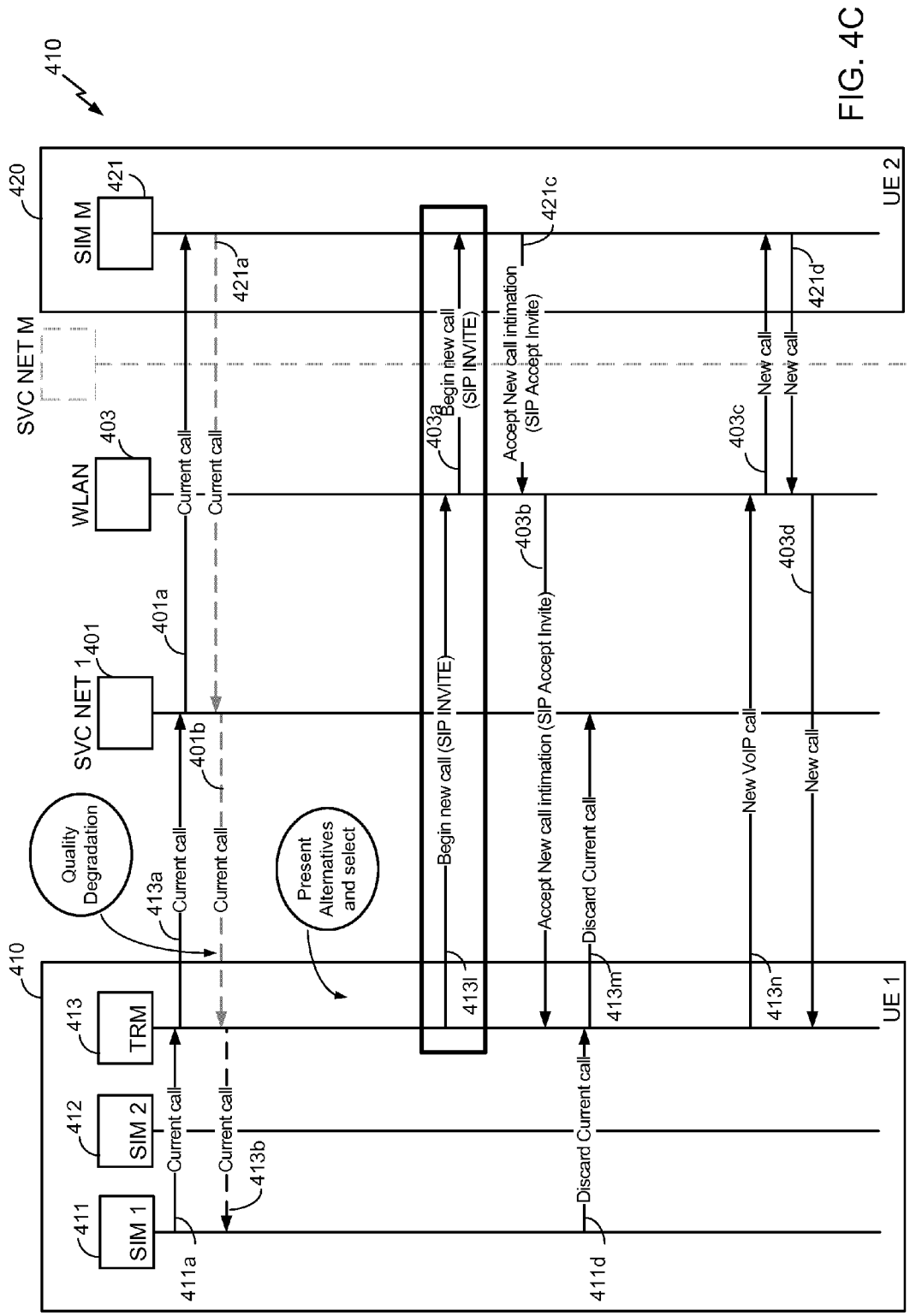
FIG. 4C is a call flow diagram illustrating an embodiment of performing an intimation and setup of a call using an alternative network in a multi-subscription device.

The call flow diagram in FIG. 4C illustrates another embodiment generally designated 410, for intimating a second call from a device 410, such as a multi-SIM device. In the illustrated example, a second call may be intimated when a first call is in progress and degrading in quality. As with the examples illustrated in FIG. 4A, and FIG. 4B, the multi-SIM communication device 410 may have previously established a call based on the link priority list 210, or the updated link priority list 210a as previously described. The calling party side of the first call may be represented, for example, as a leg 411a of a current call initiated from the first SIM 1 411 through the TRM 413. The TRM 413 may establish and maintain a leg 413a of the current call to the first service network 401. The first service network 401 may establish and maintain a link 401a of the current call to a UE 420 associated with the called party based on a subscription associated with a SIM M 421, which may be a subscription to any network, such as the network M. The UE 420 may be connect to or routed to by way of interactions with a network, such as the network M, as described above in connection with FIG. 4A, details of which interactions are omitted for ease of description. The UE 420 may establish and maintain the called party side of the current call with the multi-SIM communication device 410, for example, through a leg 421a to the service network 401 and a leg 401b to the TRM 413 and a leg 413b to the SIM 1 411.

During the current call, a quality degradation may occur associated with the first SIM 1 411. The call degradation may be detected as described above in connection with FIG. 4A. When it is determined that the current call is degrading, the link priority list 210 or the updated link priority list 210a may be presented and a selection may be made, manually or automatically, for an alternative with which to originate a second call or new call. When the alternative for the second call is selected, the multi-SIM communication device 410 may intimate the second call to the UE 420. In the present example, the alternative may involve a network such as WLAN 104, which may or may not require a subscription. In some embodiments, the WLAN 104 may use the same subscription information as the first call. The WLAN 104 may operate according to an internet protocol (IP) and may involve establishing a connection with a network access point or other access node. In some examples, an IP related data connection, such as for a voice over IP (VoIP) call, may be simultaneously established while a current call is in progress using a network associated with the currently active subscription or another subscription. In such an example, the VoIP call may use the same subscription information for the current call in progress. Thus, notification or intimation may not be required as the VoIP call may be established on the calling party end and the called party end of the call remains unchanged. Packets associated with the new VoIP call may be routed to the called party without interrupting the called party end of the current call and the original call may be continued.

In the present example, setup of the VoIP call may be performed through the sending of a session initiation protocol (SIP) message to initiate the new call, provided the called party is capable of receiving IP based calls either directly or through an appropriate gateway, server or other device. The SIP message may include a SIP INVITE message 413l, which may be directed to the called party, such as the UE 420 through the WLAN 403. The WLAN 403 may send the SIP message, as a SIP INVITE message 403a directed to the UE 420. The SIP INVITE message 403a may be direct to the called party (e.g., UE 420), for example, through a SIP gateway, a proxy server, a server or series of servers, including resources available within the first network 401 and the WLAN network 403, or other networks including network M. The SIP INVITE message 403a may contain the information of the calling party such as the name and number of the calling party. The information may be sufficient to allow the called party to know that the call is a continuation of the first call and the called party may accept the SIP INVITE message 403a to allow the call to be completed. Alternatively, the call may be established as a VoIP call on the calling party end and the called party end may remain unchanged. In one example embodiment, the SIP INVITE message 403a may be sent only to the first network 401, whereupon the first network 401 will recognize that a packet voice call is already established with the called party. The first network 401 may "accept" the SIP INVITE message 403a and the call may be continued without any affect on or knowledge of the change to VoIP on the part of the called party.

When the SIP INVITE is accepted, a SIP ACCEPT INVITE message 421c may be send from the UE 420 to the WLAN 403, possibly through the SIP gateway, proxy server or other SIP compatible entity. The WLAN 403 may forward a SIP ACCPT INVITE message 403b to the multi-SIM communication device 410. When the SIP ACCEPT INVITE message 403b is received, for example, by the TRM 413, the current call may be discarded by the multi-SIM communication device 410. The SIM 1 411 may discard the current call through a leg 411d to the TRM 413. The TRM 413 may signal the first network 401 to discard the current call through a leg 413m. The UE 420 end of the call may be similarly discarded though not shown. Since the VoIP call may not use a subscription, the current call may be discarded at any time before or after the establishment of the VoIP call, provided that the radio resources associated, for example, with the TRM 413, may allow simultaneous access by a subscription and the WLAN interface 104. When the current call is discarded, the new VoIP call may be established by a leg 413h to the WLAN 403 and a leg 403c from the WLAN 403 to the UE 420. The UE 420 may establish a leg 421d to the WLAN 403. The WLAN 403 may establish a leg 403d to the TRM 413 of the multi-SIM communication device 410 to complete the call. The various legs as described herein are illustrative and may represent a VoIP session that is established between the various elements such as the multi-SIM communication device 410, the WLAN 403, the UE 420 and possible intervening elements such as SIP gateways, proxy servers or other elements that facilitate a VoIP session or other packet data session. Since data packets associated with a VoIP session may be routed across a number of network elements, the legs may be generally representative of the data session between the multi-SIM communication device 410 and the UE 420 (e.g., through the WLAN 403) and may not show other intermediate nodes.

Figure 5:
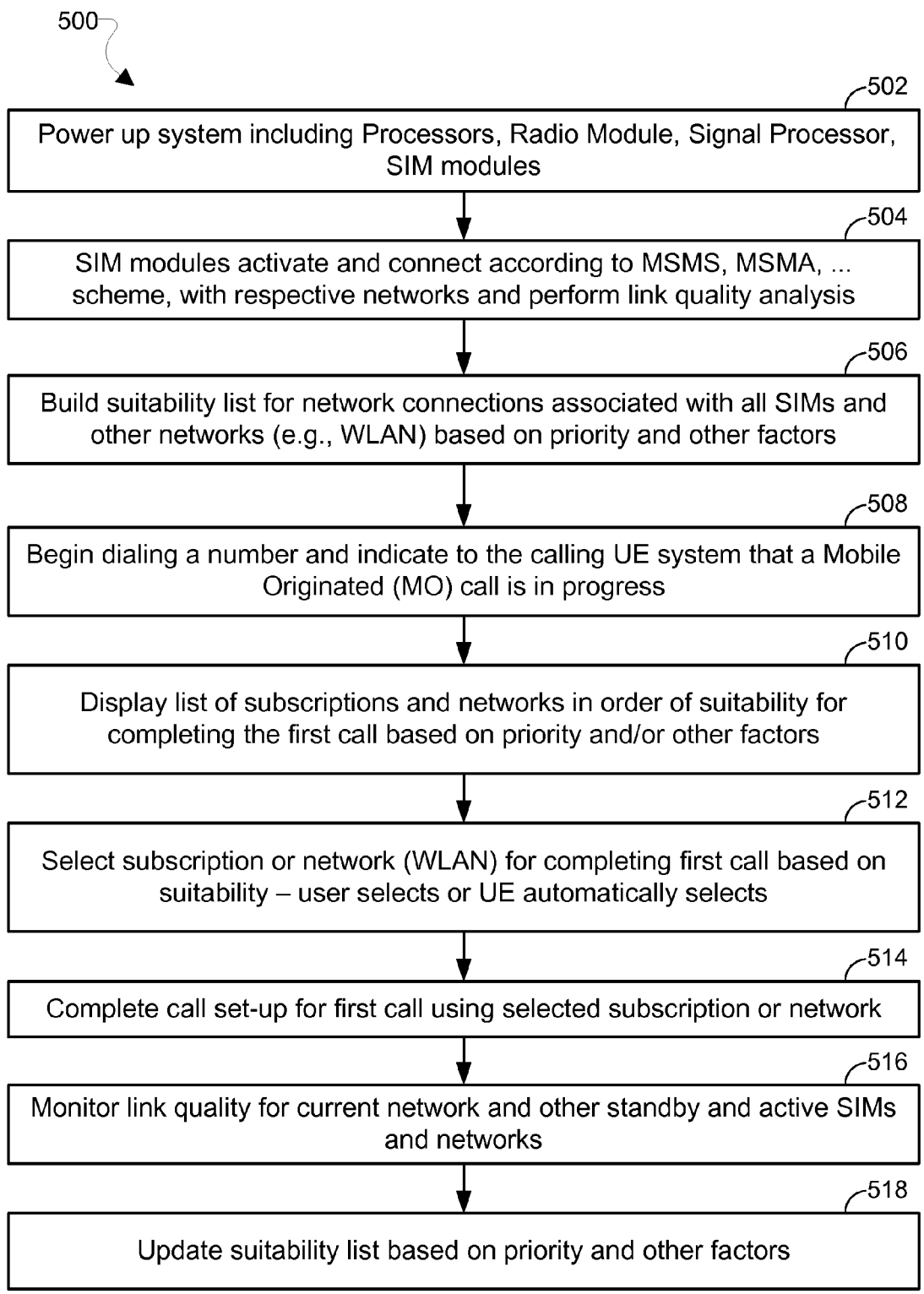
FIG. 5 is a process flow diagram illustrating a method embodiment for selecting a suitable alternative for completing a call in a multi-subscription device.

FIG. 5 illustrates an embodiment method 500 for selecting a subscription for a call to a called party using a shared signal processing resource of a multi-subscription device is illustrated. The method may include powering up a system associated with the multi-subscription device, including processors, a radio module or modules, a signal processor, and SIM modules or interfaces, in block 502. The SIM modules or interfaces may be activated, depending on whether the multi-SIM communication device is a multi-active or multi-standby device, and may allow connections between the subscriptions and respective networks. When the subscriptions are connected to the respective networks, link quality measurements and other information may be obtained in block 504. A list may be generated and stored in a device memory, based on the measured indications, priorities and other factors that may be used to rank the subscription and non-subscription alternatives in an order of suitability in block 506.

When a user of the multi-subscription device begins dialing a number, an indication may be made to the multi-subscription device system that a mobile originated (MO) call is taking place in block 508. The indication of an MO call may enable the multi-subscription device to display the list of subscriptions in an order of suitability for completing the call in block 510. When the list is displayed, one of the subscriptions or networks may be selected for completing the call based on the suitability, either automatically or manually by the user in block 512. The multi-SIM communication device may be configured to always automatically select the most suitable subscription or network in which case the list need not be displayed for selection in block 512, although information about which subscription or network was automatically selected may be displayed.

When the subscription or network is selected, call setup for the call may be completed using the selected subscription or network in block 514. While the current call is in progress, link quality and other factors may be measured or obtained for the current subscription or network associated with the current call and other subscriptions and networks in block 516. The suitability list may be updated and possibly reordered based on newly obtained measurements and other information to provide a new suitability ranking or confirm the existing ranking in block 518.

Figure 6:
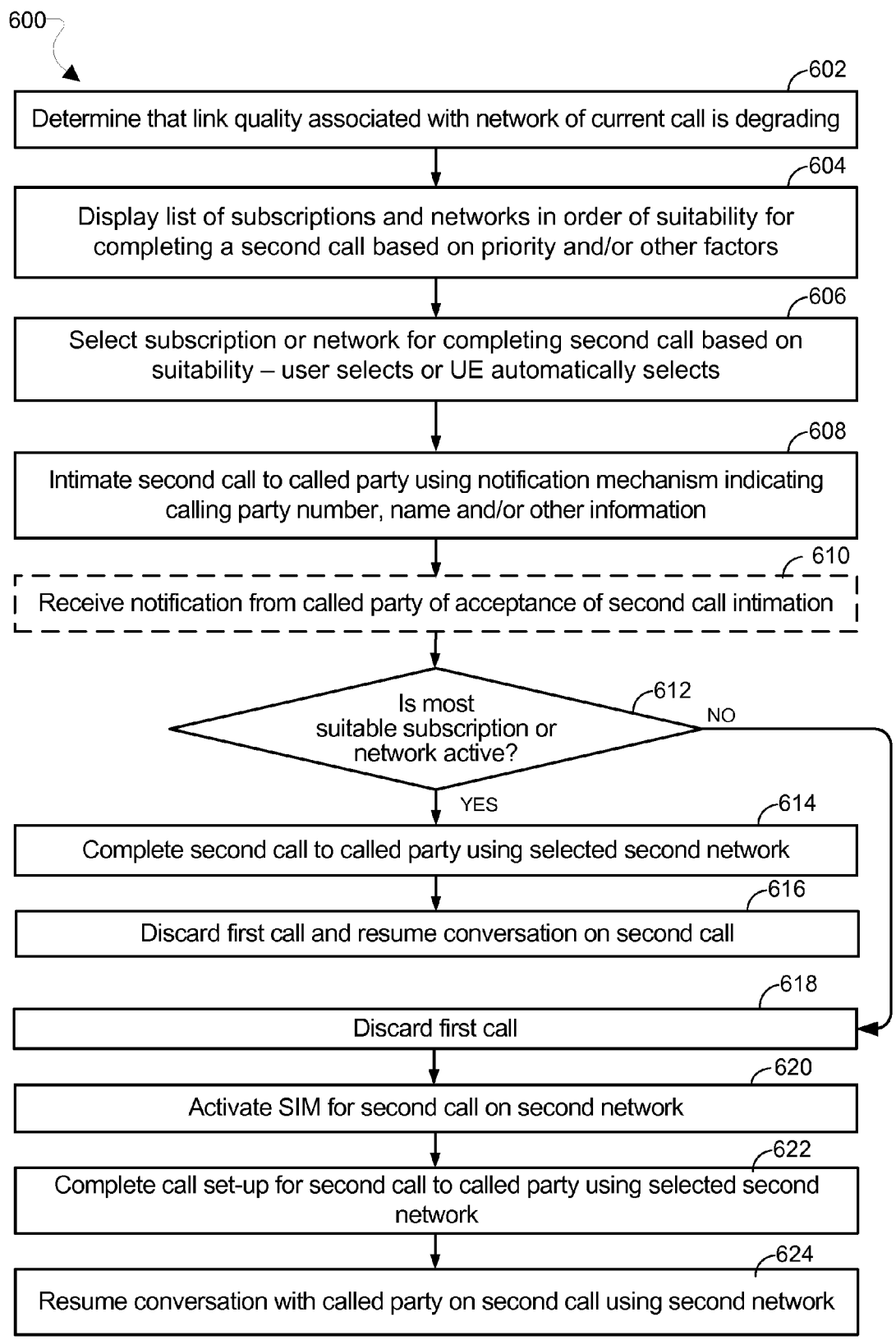
FIG. 6 is a process flow diagram illustrating a method embodiment for selecting a suitable alternative for completing a second call when a quality of first call is degrading.

FIG. 6 illustrates an embodiment method 600 of performing intimation or notification of a second call to be originated to a called party is illustrated. During monitoring, as described above in connection with FIG. 5, a determination may be made, such as through a recognition of a degradation of quality related indicators, such as SINR, RSSI, CQI, or other factors as described above, that the current call to a called party may be degrading in block 602. The recognition of degradation may involve the recognition that respective indicator or indicators, or other factors, may be falling below a predetermined threshold level, or may be displaying a falling trend that indicates that the factors may soon fall below a threshold level. When the degradation condition is determined, the suitability list of subscriptions and networks may be displayed in an order of suitability for originating a second call to the called party in block 604. When the list is displayed, one of the subscriptions or networks may be selected for completing the second call based on the suitability, either automatically or manually by the user in block 606. The multi-SIM communication device may be configured to always automatically select the most suitable subscription or network in which case the list need not be displayed for selection in block 606, although information about which subscription or network was automatically selected may be displayed.

When the subscription for completing the second call is selected, the call may be intimated to the called party in block 608 using a notification mechanism that includes information including but not limited to the calling party name, telephone number associated with the second subscription, and other information that may be used by the called party to recognize that the second call may be from the calling party associated with the current call or first call. The mechanism may be associated with the subscription for the current call, from the subscription for the second call, or other mechanism such as a network based mechanism. In some embodiments, a notification may be received from the called party indicating an acceptance of the intimation or notification.

When the selected subscription or network is active (e.g., determination block 612="YES") the second call may be completed using the selected network in block 614. The first call may be discarded when the second call is completed in block 616. When the selected subscription or network is not active (e.g., determination block 612="NO"), such as in connection with a multi-subscription multi-standby device, the first call may be discarded in block 618. The SIM for the subscription selected for the second call may be activated in block 620. The second call may be completed using the selected network in block 622. When the second call is completed the conversation between the calling party and the called party may be resumed in block 624. While the method embodiment may be ended with the completion of the second call, e.g., in block 616 and block 624, additional iterations of the method may be performed under conditions whereby the quality of the second call degrades to establish a third call on a next-most-suitable subscription or network. Further, some delay or hysteresis or other conditions may be applied or imposed to prevent rapid switching between subscriptions.

Figure 7A:
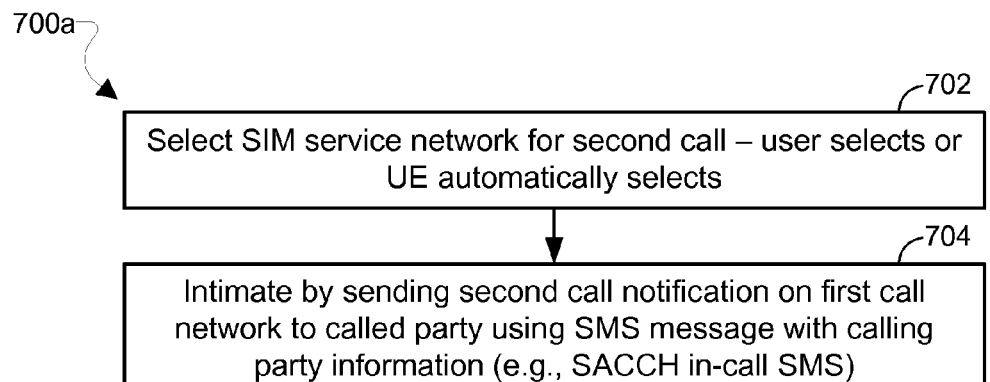
FIGS. 7A, 7B and 7C are process flow diagrams illustrating embodiment methods for performing intimation of a second call in a multi-subscription device.
Figure 7B:
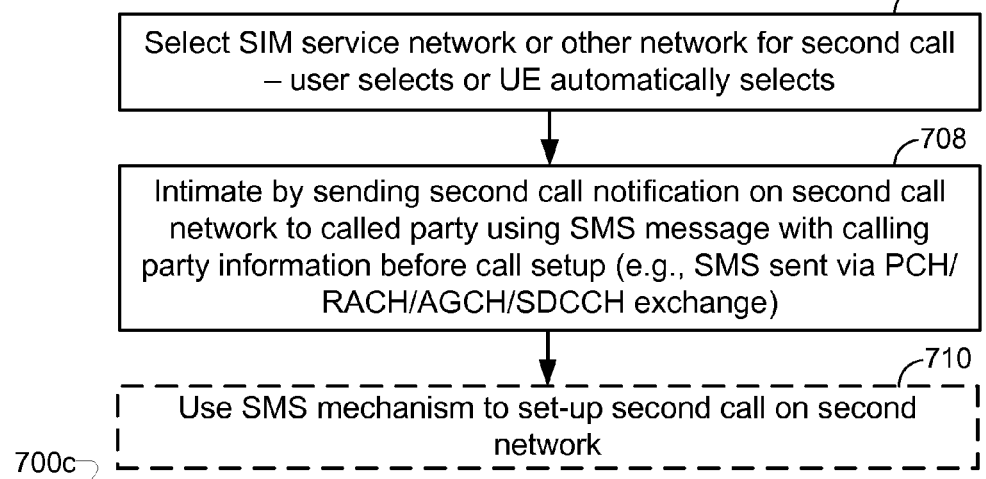
Figure 7C:
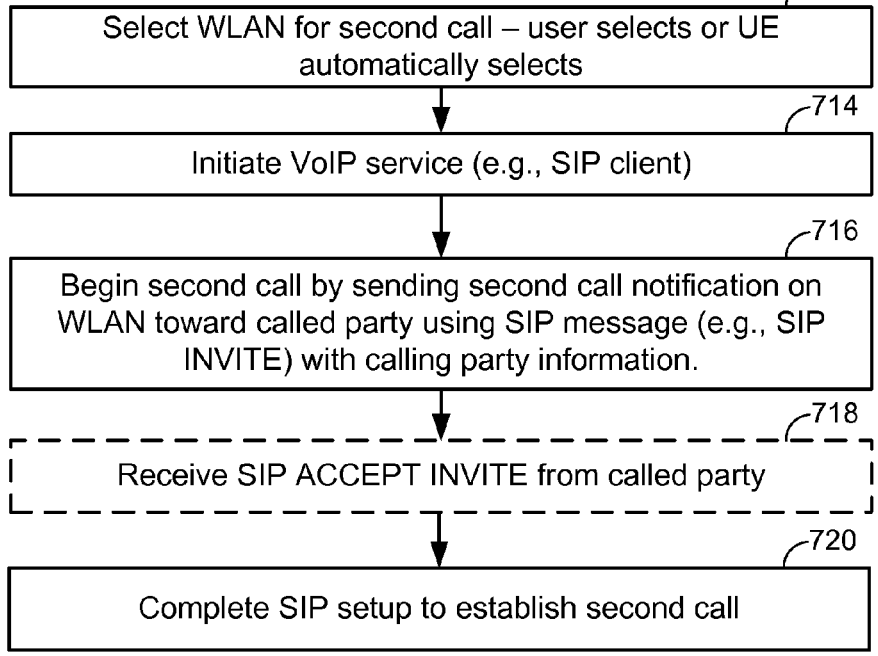

FIGS. 7A-7C illustrates alternative embodiment method 700a, 700b, 700c for intimation of a second call to a called party are illustrated. When a subscription or network is selected for a second call, either manually or automatically, in block 702, the second call may be intimated to the called party on the first network, e.g. during the first call in method 700a illustrated in FIG. 7A. Intimation may be performed by sending a notification of the second call to the called party using an SMS message sent on the subscription or network associated with the current call or first call in block 704. The SMS message may contain called party information such as the called party number, and calling party information such as the calling party name and the calling information for the second call, including the originating phone number of the second call, so that the called party may know that the second call is from the calling party and represents a continuation of the first call. The SMS message may further contain information regarding the reason for the second call, e.g., quality degradation of the first call. In a GSM network, for example, the SMS message may be sent, for example, on the slow associated control channel (SACCH) associated with the first call while the first call is in progress. Depending on whether the multi-SIM communication device associated with the calling party supports multiple active subscriptions, the second call may be completed with or without discarding the first call. Further, the second call may be completed with or without receiving an indication of whether the second call is accepted or will be accepted by the called party. While one example of a mechanism to send the SMS message is described above, other mechanisms may be possible depending on the evolution of the network and the supported modes of operation of the network.

In the embodiment method 700b illustrated in FIG. 7B, when subscription or network is selected for a second call, either manually or automatically, in block 706, the second call may be intimated to the called party on the second network before a second call is set up. Intimation may be performed by sending a notification of the second call to the called party using an SMS message sent on the subscription or network associated with the second call in block 708. In a GSM network, for example, the SMS may be sent based on an exchange of messaging between the multi-SIM communication device and the second network starting with receipt of a paging message on the paging channel (PCH) associated with the second network. The calling party may respond with a channel request on the random access channel (RACH) and may receive a message on the access grant channel (AGCH) indicating the available stand alone dedicated control channel (SDCCH), which may be used before a traffic channel (TCH) is assigned. The message may be sent on the SDCCH channel to the called party. If a traffic channel is assigned before the message is sent, the message may be sent as in the above example, using the SACCH. In some embodiments, the second call may be established using the assigned TCH to improve latency.

In embodiment method 700c illustrated in FIG. 7C, when a wireless local area network (WLAN) is selected for a second call, either manually or automatically, in block 712, the second call to the called party on the second network may be initiated. A voice over IP (VoIP) service may be initiated in block 714, such as a session initiation protocol (SIP) user agent (UA) or user agent client (UAC) to send and receive messages. The calling party may be identified using a universal resource identifier (URI) associated with the multi-subscription device and may contact the called party with a URI associated with the called party. The URI may identify a communication resource and may include a telephone number, email address, or other identifier of a communications resource. In the present example, initiation of the second call may be performed by the WLAN in block 716 by sending a SIP INVITE message toward the called party, or through an agent associated with the called party. In one example embodiment, the SIP INVITE may be sent to the first network associated with the first subscription and the calling party. The first network may recognize that a packet voice session is already in progress with the called party. The SIP INVITE may be accepted by the network to set up a VoIP on the leg of the call between the calling party and the first network. Remaining legs of the call on the called party side may be unchanged and the call may be continued.

When the UE associated with the called party has an IP capability, the call may be directed to the URI associated with the called party UE. When the UE does not have an IP capability, it may nevertheless be possible to direct the call to the mobile number associated with the called party through a VoIP termination gateway, or other mechanism, that may be co-located with mobile switching equipment associated with the called party. The VoIP termination gateway may convert VoIP data and signaling from the calling party into data and signaling compatible with the called party and may convert the data and signaling from the called party into VoIP messages and signaling. In an optional example embodiment, the called party may accept the SIP INVITE and the calling party may receive a SIP ACCEPT INVITE from the called party in block 718.

The SIP setup procedure may be completed and the second call may be established in block 720. In various embodiments, such as when the VoIP call is established using only the leg of the call between the calling party and the first network, or when the subscription information associated with the first call is used in the SIP INVITE message, the called party may not be aware that the calling party has switched to a VoIP call, and the call may proceed without significant interruption. Voice packets may be routed from the calling party to the called party in a similar manner as packets from the first call. Thus, the called party end may remain unaffected by the switch to the VoIP call on the calling party end.

In advanced evolutions, such as the planned long term evolution (LTE) of networks designed in accordance with various specifications under the Third Generation Partnership Project (3GPP), SMS may be sent in a non-access layer of the network protocol, via a newly specified SGs interface that supports circuit-switched fallback (CSFB). An SMS message may be encapsulated in the non-access stratum (NAS) signaling protocol used between the UE and a mobility management entity (MME). SMS messages may be forwarded between the mobile switching center (MSC)/visited location register (VLR) where the UE is currently registered in the combined evolved packet-switched system (EPS)/international mobile subscriber identity (IMSI) attach procedure. The SGs interface is positioned between MME and MSC/VLR. All entities supporting CSFB (MME, MSC and UE) are required to support SMS via SGs although entities that support SMS via SGs not necessarily have to support CSFB. The implementation of SMS via SGs may involve only the MME, MSC and UE, of which only the MSC may belong to the legacy circuit switched network.

For voice-over LTE (VoLTE) implementation, SMS may be carried via IP (SMS-over-IP), whereby the SMS message may be carried as a payload within the SIP protocol. A VoLTE handset may be configured to support SIP, and SMS messages may be sent as an encapsulated data in a SIP MESSAGE addressed to the IP multimedia public identity (IMPU) of the recipient. The SIP MESSAGE may be received and processed by the serving call state control function (S-CSCF) node serving the recipient. Routing decisions for the SIP MESSAGE may be made according to subscription profile of the recipient and network operator policy. If the S-CSCF determines that the SIP MESSAGE can not be forwarded to the recipient via the IP multimedia subsystem (IMS) domain, such as when the recipient is "off-line" (e.g., not currently attached to the IMS domain), the SIP MESSAGE may be routed to an IP short message gateway (IP-SM-GW) where it may be interworked to the legacy SMS domain. The SIP MESSAGE may be decapsulated and the SMS payload may be extracted and forwarded as a normal SMS. The recipient may then receive the SMS via the legacy circuit switched network, for example, at the transport-level. In other configurations, the IP-SM-GW may be involved when service-level interworking is needed, such as when an SMS needs to be interworked with a (open mobile alliance) OMA-SIMPLE or OMA-CPM SIP MESSAGE, which is typically used in connection with more advanced communication services. While several examples of messaging mechanisms have been described herein above, these examples are intended to be illustrative and non-limiting. It will be noted that under current network configurations, and as standards evolve, many alternatives are possible without departing from the inventive concepts disclosed herein.

Figure 8:
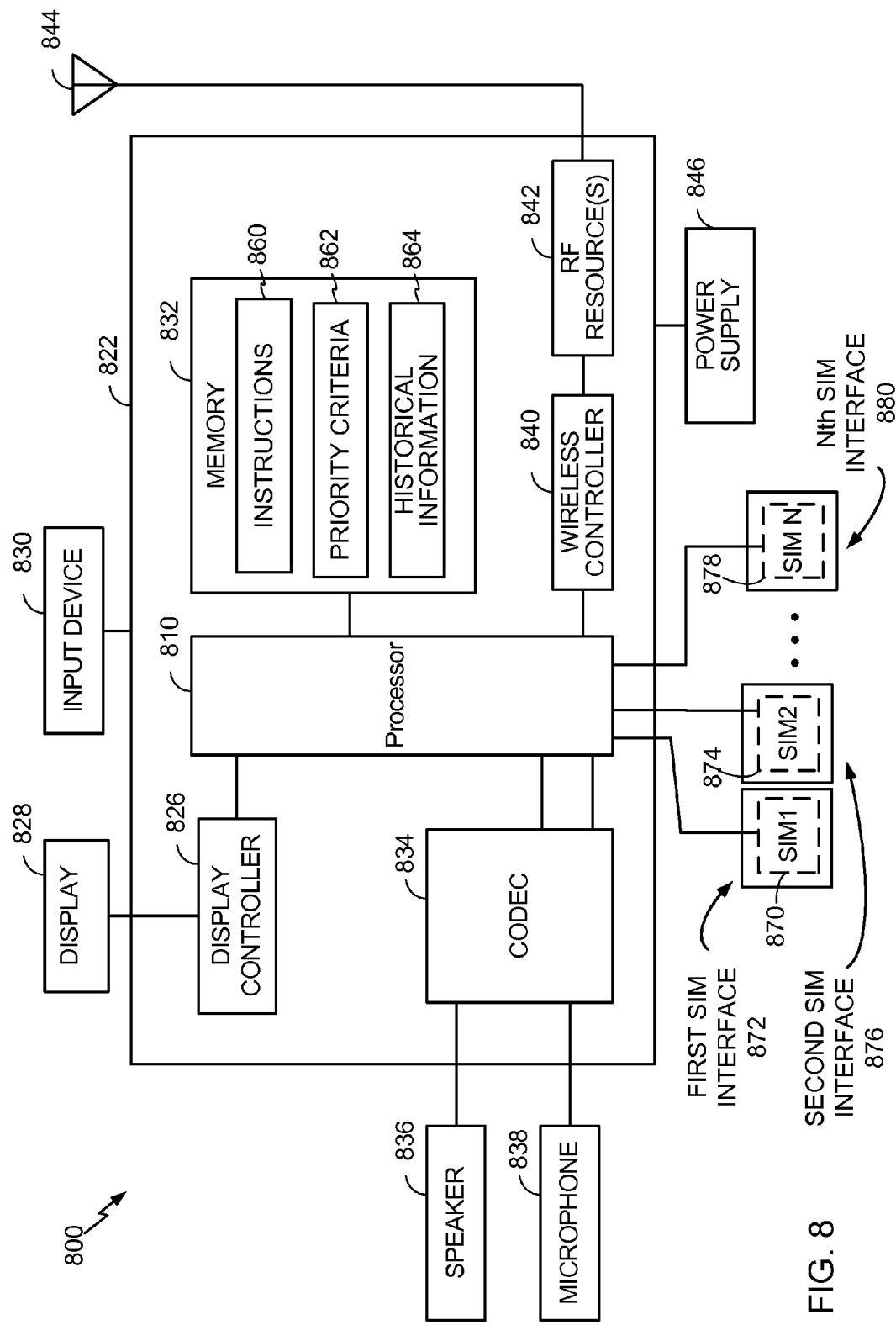
FIG. 8 is a block diagram of an embodiment of a portable electronic device suitable for performing multi-subscription diversity in a multi-subscription device.

Referring to FIG. 8, a block diagram of a particular illustrative embodiment of a portable electronic device may be depicted and generally designated 800. In one embodiment, the portable electronic device 800 of FIG. 8 includes or may be included within the multi-SIM communication device 110 of FIG. 1C. Further, all or part of the methods described above with reference to FIG. 5, FIG. 6 and FIG. 7 may be performed at or by the portable electronic device 800 of FIG. 8. The portable electronic device 800 includes a processor, such as a digital signal processor (DSP) 810, coupled to a memory 832. The memory 832 may include a computer readable tangible medium that stores instructions 860, at least one priority criteria 862, and historical information 864. The instructions 860 may be executable by the DSP 810, and may be executable by other processors, controller, or logic.

In the embodiment illustrated in FIG. 8, the portable electronic device 800 includes a first SIM interface 872, a second SIM interface 876 and additional SIM interfaces up to an Nth interface 880. The first SIM interface 872 may perform the function of receiving a first SIM 872 that may be associated with a first subscription, the second SIM interface 876 may perform the function of receiving a second SIM 874 that may be associated with a second subscription and the Nth SIM interface 880 may perform the function of receiving an Nth SIM 878. For example, at least one of the SIM interfaces 872, 876, 878 may be a SIM card connector that includes a body having an accommodating space for a SIM card and multiple connected-through receptacles for receiving conducting terminals of a received SIM card. An electrical signaling contact with the SIM card may be made through the conducting terminals and the receptacles. An example interface may include a serial or parallel (e.g., 6-pin, 8-pin, N-pin) connection. Further, multiple SIM card sizes may be accommodated (e.g., full-size, mini-SIM, or micro-SIM). In alternative embodiments, the portable electronic device 800 may not include multiple SIM interfaces when multiple subscriptions are associated with a common UIM (e.g., a common SIM).

FIG. 8 also shows a display controller 826 that may be coupled to the digital signal processor 810 and to a display 828. A coder/decoder (CODEC) 834 may also be coupled to the digital signal processor 810 for generating digital signals from analog signals and vice versa according to an encoding and decoding scheme. A speaker 836 and a microphone 838 may be coupled to the CODEC 834. FIG. 8 also illustrates that a wireless controller 840 may be coupled to the digital signal processor 810, to one or more signal processing resources (e.g., RF resources 842), and to a wireless antenna 844. In addition to connections to various subscription networks as described herein, network connections to a local area network, such as connections to the WLAN 104, may be accomplished through the wireless controller 840. In a particular embodiment, the wireless controller 840 may include or be included within the controller 120 of FIG. 1C, and the RF resources 842 may correspond to the signal processing resource(s) 106 of the single Rx-Tx chain 104 of FIG. 1C.

The wireless controller 840 may perform the function of managing requests to access a signal processing resource (e.g., one or more RF resources 842) during various access periods or intervals, related to the first subscription, the second subscription, the Nth subscription and requests to access the WLAN 104. For example, a multi-SIM-multi-standby communication device (e.g., an MSMS communication device) or a multi-SIM, multi-active communication device (e.g., a MSMA communication device), the wireless controller 840 may manage contention among a plurality of SIMs and an arbitrary combination of multiple radio technologies. The wireless controller 840 may further perform the function of managing the granting of access to the signal processing resource to the first subscription, the second subscription, the Nth subscription and the WLAN, during various access periods or intervals. In various embodiments, the MSMS communication device may assume or determine the paging retransmission schedule (the "retransmission interval") of a mobile switching center server ("MSC"). The MSC may schedule paging messages to be transmitted to a subscription on the MSMS communication device attempting to perform discontinuous reception ("DRX"). If the subscription does not respond to the page, the MSC may schedule a retransmission of the paging message (a "repeated page") during a future retransmission interval.

The wireless controller 840 may further perform the function of measuring or obtaining information that may be related to the priority criteria 862 and/or the historical information 864 and may be used to update information related to previous subscription access to the signal processing resource, such as link quality related measurements.

In a particular embodiment, the DSP 810, the display controller 826, the memory 832, the CODEC 834, the wireless controller 840, and the RF resources 842 are included in a system-in-package or system-on-chip device 822. In a particular embodiment, an input device 830 and a power supply 846 are coupled to the system-on-chip device 822. Moreover, in a particular embodiment, as illustrated in FIG. 8, the display 828, the input device 830, the speaker 836, the microphone 838, the wireless antenna 844, the power supply 846, the first SIM 870, the first SIM interface 872, the second SIM 874, and the second SIM interface 876 are external to the system-on-chip device 822. However, each of the display 828, the input device 830, the speaker 836, the microphone 838, the wireless antenna 844, the power supply 846, the first SIM 870, the first SIM interface 872, the second SIM 874, and the second SIM interface 876 may be coupled to a component of the system-on-chip device 822, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality may be implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that may be specific to a given function.

In one or more exemplary aspects, the functions described may be implemented in hardware, software, firmware, or any combination thereof. implemented in software, the functions may be stored as one or more instructions or code (i.e., processor-executable instructions) on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments may be provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the following claims and the principles and novel features disclosed herein.

What is claimed is:

1. A method of establishing a second call as a continuation of a first call on a multi-subscriber identity module (SIM) communication device, comprising:

determining whether a quality of the first call between a calling party and a called party using a first subscription for a first network is degrading;

providing network alternatives for establishing the second call in response to determining that the quality of the first call is degrading;

selecting one of the network alternatives based on an order of suitability for establishing the second call, wherein the selected one of the network alternatives comprises a second SIM associated with a second network; and notifying the called party using information associated with the calling party and the second call before the second call is originated, the information associated with the second call identifying the calling party to the called party before the second call is originated, wherein notifying the called party comprises sending a short message service (SMS) to the called party on the second network including the information associated with the second call.

2. The method of claim 1, further comprising:
discarding the first call between the calling party and the called party using the first subscription before the second call is originated;
activating the selected one of the network alternatives for originating the second call; and
completing the second call between the calling party and the called party using the activated network alternative.

3. The method of claim 1, further comprising:
completing the second call between the calling party and the called party using the selected one of the network alternatives; and
discarding the first call between the calling party and the called party using the first subscription when the second call is completed.

4. The method of claim 1, further comprising:
receiving an acceptance associated with notifying the called party using information associated with the calling party and the second call.

5. The method of claim 1, wherein determining whether a quality of the first call using a first subscription is degrading comprises:
obtaining link quality information associated with the first call; and
determining whether a value of the obtained link quality information is below a threshold.

6. The method of claim 5, wherein the obtained link quality information includes one or more of: a signal information to noise ratio (SINR), a received signal strength indicator (RSSI), a call quality index (CQI), and a transmit power level.

7. The method of claim 1, wherein selecting one of the network alternatives based on an order of suitability for originating the second call comprises:
displaying a list of the network alternatives in an order of suitability for originating the second call; and
receiving a selection of one network alternative from the list of the network alternatives.

8. The method of claim 1, wherein selecting one of the network alternatives based on an order of suitability for originating the second call comprises automatically selecting the one of the network alternatives from a list of the network alternatives arranged in an order of suitability for originating the second call.

9. The method of claim 1, wherein sending the SMS includes sending the SMS using an application installed on a calling party device and a called party device, wherein the application includes one of a messenger application, an instant messaging application, and a social media application.

10. The method of claim 1, wherein:
sending the SMS comprises sending the SMS on a first leg using the second network and sending the SMS on a second leg to the called party using the first network including the information associated with the second call.

11. The method of claim 1, wherein:
the selected one of the network alternatives comprises a wireless local area network (WLAN);
the second call comprises a voice over Internet Protocol (VoIP) call; and
sending the SMS comprises sending the SMS encapsulated in a session initiation protocol (SIP) MESSAGE to the called party on the WLAN including the information associated with the second call.

12. A multi-subscriber identity module (SIM) communication device, comprising:
a processor configured with processor-executable instructions to:
determine whether a quality of a first call between a calling party and a called party using a first SIM associated with a first one of a plurality of network subscriptions for a first network is degrading;
provide network alternatives for establishing a second call in response to determining that the quality of the first call is degrading;
select one of the network alternatives based on an order of suitability for establishing the second call, wherein the selected one of the network alternatives comprises a second SIM associated with a second network; and
notify the called party using information associated with the calling party and the second call before the second call is originated, the information associated with the second call identifying the calling party to the called party before the second call is originated,
wherein the processor is configured with processor-executable instructions to notify the called party by sending a short message service (SMS) to the called party on the second network including the information associated with the second call.

13. The multi-SIM communication device of claim 12, wherein the processor is further configured with processor-executable instructions to:
discard the first call between the calling party and the called party using the first one of the plurality of network subscriptions before the second call is originated;
activate the selected one of the network alternatives for originating the second call; and
complete the second call between the calling party and the called party using the activated selected one of the network alternatives.

14. The multi-SIM communication device of claim 12, wherein the processor is further configured with processor-executable instructions to:
complete the second call between the calling party and the called party using the selected one of the network alternatives; and
discard the first call between the calling party and the called party using the first one of the plurality of network subscriptions for a first network when the second call is completed.

15. The multi-SIM communication device of claim 12, wherein the processor is further configured with processor-executable instructions to receive an acceptance associated with notifying the called party using information associated with the calling party and the second call.

16. The multi-SIM communication device of claim 12, wherein the processor is further configured with processor-executable instructions to determine whether a quality of the first call using a first one of the plurality of network subscriptions for a first network is degrading by:
obtaining link quality information associated with the first call; and determining whether a value of the obtained link quality information is below a threshold.

17. The multi-SIM communication device of claim 16, wherein the obtained link quality information includes one or more of: a signal information to noise ratio (SINR), a received signal strength indicator (RSSI), a call quality index (CQI), and a transmit power level.

18. The multi-SIM communication device of claim 12, further comprising a display,
wherein the processor is further configured with processor-executable instructions to select one of the network alternatives based on an order of suitability for originating the second call by:
displaying a list of the network alternatives in an order of suitability for originating the second call on the display; and
receiving a selection of the one of the network alternatives from the list of the network alternatives.

19. The multi-SIM communication device of claim 12, wherein the processor is configured with processor-executable instructions to select one of the network alternatives based on an order of suitability for originating the second call by automatically selecting the one of the network alternatives from a list of network alternatives arranged in an order of suitability for originating the second call.

20. The multi-SIM communication device of claim 12, wherein the processor is further configured with processor-executable instructions to send the SMS by sending the SMS using an application installed on a calling party device and a called party device, wherein the application includes one of a messenger application, an instant messaging application, and a social media application.

21. The multi-SIM communication device of claim 12, wherein the processor is configured with processor-executable instructions to perform operations such that:
the selected one of the network alternatives comprises a wireless local area network (WLAN);
the second call comprises a voice over Internet Protocol (VoIP) call; and
sending the SMS comprises sending the SMS encapsulated in a session initiation protocol (SIP) MESSAGE to the called party on the WLAN including the information associated with the second call.

22. A multi-subscriber identity module (SIM) communication device, comprising:
means for determining whether a quality of a first call between a calling party and a called party using a first SIM associated with a first one of a plurality of network subscriptions for a first network is degrading;
means providing network alternatives for establishing a second call in response to determining that the quality of the first call is degrading;
means for selecting one of the network alternatives based on an order of suitability for establishing the second call; and
means for notifying the called party using information associated with the calling party and the second call before the second call is originated, the information associated with the second call identifying the calling party to the called party before the second call is originated,
wherein:
means for selecting one of the network alternatives comprises means for selecting a second network associated with a second SIM associated with a second one of the plurality of network subscriptions; and
means for notifying the called party using information associated with the calling party and the second call before the second call is originated comprises means for sending a short message service (SMS) to the called party on the second network including the information associated with the second call.

23. The multi-SIM communication device of claim 22, further comprising:
means for discarding the first call between the calling party and the called party using the first one of the plurality of network subscriptions before the second call is originated;
means for activating the selected one of the network alternatives for originating the second call; and
means for completing the second call between the calling party and the called party using the activated selected one of the network alternatives.

24. The multi-SIM communication device of claim 22, further comprising:
means for completing the second call between the calling party and the called party using the selected one of the network alternatives; and
means for discarding the first call between the calling party and the called party using the first when the second call is completed.

25. The multi-SIM communication device of claim 22, further comprising means for receiving an acceptance of the notifying the called party using information associated with the calling party and the second call.

26. The multi-SIM communication device of claim 22, wherein means for determining whether a quality of the first call using the first SIM associated with the first one of the plurality of network subscriptions is degrading comprises:
means for obtaining link quality information associated with the first call; and
means for determining whether a value of the obtained link quality information is below a threshold.

27. The multi-SIM communication device of claim 26, wherein the obtained link quality information includes one or more of: a signal information to noise ratio (SINR), a received signal strength indicator (RSSI), a call quality index (CQI), and a transmit power level.

28. The multi-SIM communication device of claim 22, wherein means for selecting a network alternative based on an order of suitability for originating the second call comprises:
means for displaying a list of network alternatives in an order of suitability for originating the second call on a display; and
means for receiving a selection of the network alternative from the list of network alternatives.

29. The multi-SIM communication device of claim 22, wherein means for selecting a network alternative based on an order of suitability for originating the second call automatically comprises means for selecting the network alternative from a list of network alternatives arranged in an order of suitability for originating the second call.

30. The multi-SIM communication device of claim 22, wherein means for sending the SMS comprises means for sending the SMS using an application installed on a calling party device and a called party device, wherein the application includes one of a messenger application, an instant messaging application, and a social media application.

31. The multi-SIM communication device of claim 22, wherein:
the selected one of the network alternatives comprises a wireless local area network (WLAN);

the second call comprises a voice over Internet Protocol (VoIP) call; and means for sending the SMS comprises means for sending the SMS encapsulated in a session initiation protocol (SIP) MESSAGE to the called party on the WLAN including the information associated with the second call.

32. A non-transitory computer readable storage medium having stored thereon processor-executable instructions configured to cause a processor of a multi-subscriber identity module (SIM) communication device to perform operations comprising:

determining whether a quality of a first call between a calling party and a called party using a first one of a plurality of network subscriptions for a first network is degrading;

providing network alternatives for establishing a second call in response to determining that the quality of the first call is degrading;

selecting one of the network alternatives based on an order of suitability for establishing the second call, wherein the selected one of the network alternatives comprises a second SIM associated with a second network; and notifying the called party using information associated with the calling party and the second call before the second call is originated, the information associated with the second call identifying the calling party to the called party before the second call is originated, wherein notifying the called party comprises sending a short message service (SMS) to the called party on the second network including the information associated with the second call.

33. The non-transitory computer readable medium of claim 32, wherein the stored processor-executable instructions are configured to cause the processor of a multi-SIM communication device to perform operations further comprising:

discarding the first call between the calling party and the called party using the first one of the plurality of network subscriptions before the second call is originated;

activating the selected one of the network alternatives for originating the second call; and completing the second call between the calling party and the called party using the activated selected one of the network alternatives.

34. The non-transitory computer readable medium of claim 32, wherein the stored processor-executable instructions are configured to cause the processor of a multi-SIM communication device to perform operations further comprising:

completing the second call between the calling party and the called party using the selected one of the network alternatives; and discarding the first call between the calling party and the called party using the first one of the plurality of network subscriptions when the second call is completed.

35. The non-transitory computer readable medium of claim 32, wherein the stored processor-executable instructions are configured to cause the processor of a multi-SIM communication device to perform operations further comprising:

receiving an acceptance associated with notifying the called party using information associated with the calling party and the second call.

36. The non-transitory computer readable medium of claim 32, wherein the stored processor-executable instructions are configured to cause the processor of a multi-SIM communication device to perform operations such that determining whether a quality of the first call using a first one of a plurality of network subscriptions is degrading comprises:

obtaining link quality information associated with the first call; and determining whether a value of the obtained link quality information is below a threshold.

37. The non-transitory computer readable medium of claim 36, wherein the obtained link quality information includes one or more of: a signal information to noise ratio (SINR), a received signal strength indicator (RSSI), a call quality index (CQI), and a transmit power level.

38. The non-transitory computer readable medium of claim 32, wherein the stored processor-executable instructions are configured to cause the processor of a multi-SIM communication device to perform operations such that selecting one of the network alternatives based on an order of suitability for originating the second call comprises:

displaying a list of the network alternatives in an order of suitability for originating the second call on a display; and receiving a selection of the one of the network alternatives from the list of the network alternatives.

39. The non-transitory computer readable medium of claim 32, wherein the stored processor-executable instructions are configured to cause the processor of a multi-SIM communication device to perform operations such that selecting one of the network alternatives based on an order of suitability for originating the second call comprises automatically selecting the one of the network alternatives from a list of network alternatives arranged in an order of suitability for originating the second call.

40. The non-transitory computer readable medium of claim 32, wherein the stored processor-executable instructions are configured to cause the processor of a multi-SIM communication device to perform operations such that sending the SMS comprises sending the SMS using an application installed on a calling party device and a called party device, wherein the application includes one of a messenger application, an instant messaging application, and a social media application.

41. The non-transitory computer readable medium of claim 32, wherein the second call comprises a voice over Internet Protocol (VoIP) call, and wherein the stored processor-executable instructions are configured to cause the processor of a multi-SIM communication device to perform operations such that selecting one of the network alternatives and sending the SMS comprise:

selecting a wireless local area network (WLAN); and sending the SMS encapsulated in a session initiation protocol (SIP) MESSAGE to the called party on the WLAN including the information associated with the second call.

* * * * *